(12) United States Patent
Treves et al.

(10) Patent No.: US 10,777,096 B2
(45) Date of Patent: Sep. 15, 2020

(54) SYSTEM FOR ASSISTING IN FOREIGN LANGUAGE LEARNING

(71) Applicant: Amazon Technologies, Inc., Seattle, WA (US)

(72) Inventors: Dikla Treves, New York, NY (US); Alexandra Hsiao, Brooklyn, NY (US); Fangbing Qiu, New York, NY (US); Aman Sagar, Hoboken, NJ (US); Dan Stefanescu, New York, NY (US); Michael Angelo Macchione, III, Glen Ridge, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 545 days.

(21) Appl. No.: 14/981,176

(22) Filed: Dec. 28, 2015

(65) Prior Publication Data
US 2017/0186338 A1 Jun. 29, 2017

(51) Int. Cl.
G09B 19/06 (2006.01)
G09B 7/02 (2006.01)
G09B 5/06 (2006.01)

(52) U.S. Cl.
CPC ............... *G09B 19/06* (2013.01); *G09B 5/06* (2013.01); *G09B 7/02* (2013.01)

(58) Field of Classification Search
CPC ...................................................... G09B 19/06

USPC ......................................................... 434/157
See application file for complete search history.

(56) References Cited

U.S. PATENT DOCUMENTS

| 8,477,109 B1* | 7/2013 | Freed | G06F 3/041 345/173 |
|---|---|---|---|
| 9,680,945 B1* | 6/2017 | Treves | H04L 67/22 |
| 2006/0253272 A1* | 11/2006 | Gao | G10L 13/00 704/2 |
| 2006/0286527 A1 | 12/2006 | Morel | |
| 2015/0348433 A1* | 12/2015 | Gatterbauer | G09B 7/02 434/353 |

OTHER PUBLICATIONS

PCT Search Report and Written Opinion dated Apr. 25, 2017 for PCT application No. PCT/IB2016/001926, 10 apges.
European Office Action dated Apr. 7, 2020 for European Patent Application No. 16843209.4, a counterpart foreign application of the U.S. Appl. No. 14/981,176, 4 pages.

* cited by examiner

*Primary Examiner* — Thomas J Hong
(74) *Attorney, Agent, or Firm* — Lee & Hayes, P.C.

(57) ABSTRACT

Described herein are techniques for improving foreign language learning of a user. In some cases, the system may present text in a foreign language to the user while outputting audio associated with the text. At various periods, the system may prompt the user to rate the difficulty associated with the text and based at least in part on the difficulty rating presenting the user with various options to alter the experience associated with consuming the text to improve the users foreign language absorption rate.

20 Claims, 16 Drawing Sheets

SYSTEM FOR ASSISTING IN FOREIGN LANGUAGE LEARNING

BACKGROUND

A large and growing population of users is enjoying entertainment through the consumption of digital content, such as music, movies, images, electronic books, and so on. The users employ various devices with electronic displays such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth to view the digital content.

In some cases, the digital content may be utilized by users in a variety of contexts. For example, users desiring to learn a language may utilize digital content in that language to increase the user's exposure to the language, with the goal of increasing the user's fluency. In language learning applications, the absorption of language within a content item may greatly affect the ability of a user to develop foreign language skills. However, the absorption of a particular content item may vary between individual users. Consequently, selecting digital content appropriate for absorption may be challenging to the individual.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
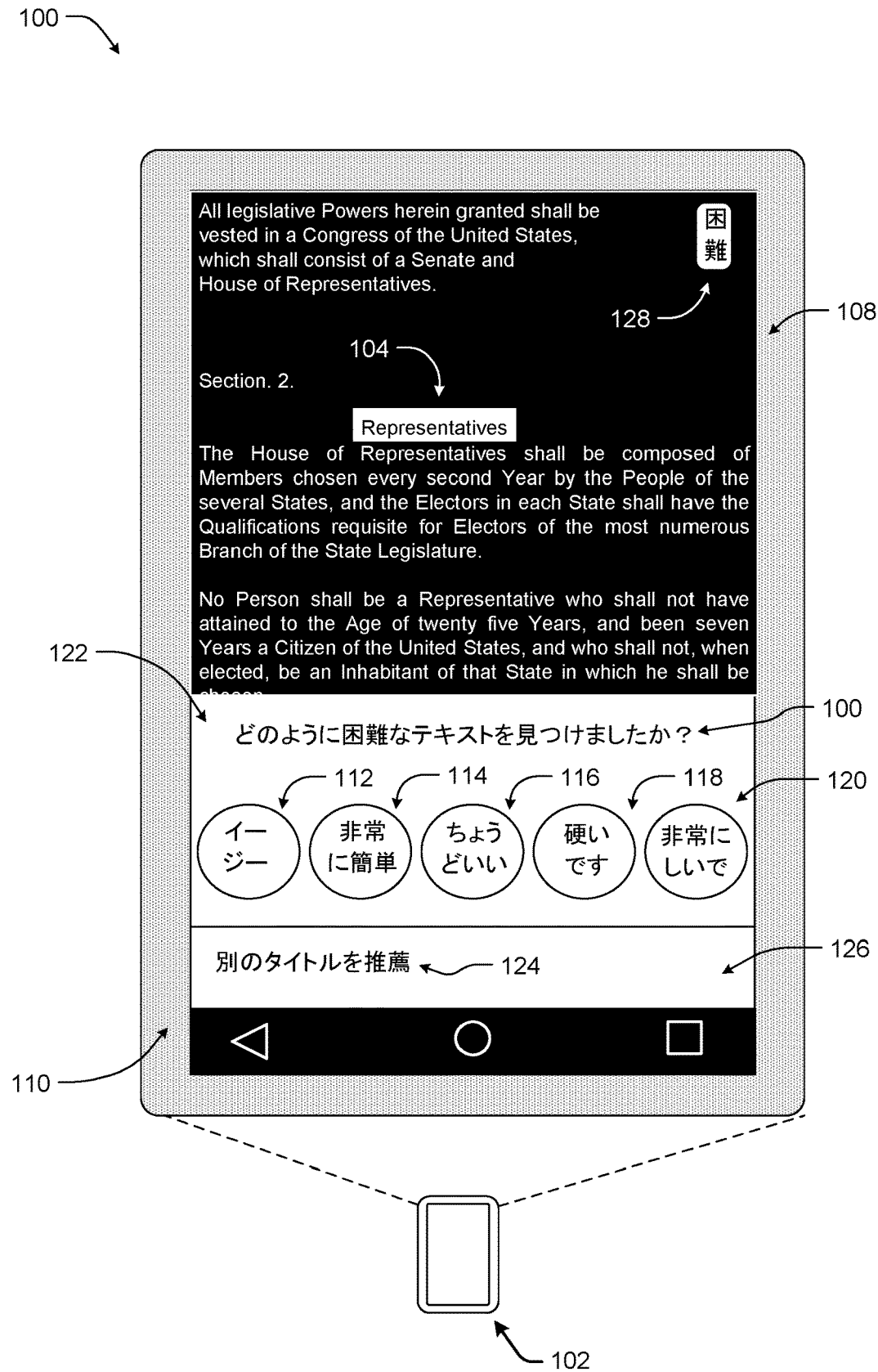
FIG. 1 illustrates an example depicting a device facilitating content consumption associated with foreign language learning.

Described herein are devices and techniques for assisting an individual in foreign language learning via consumption of electronic content items in a guided learning environment. For example, a native Japanese speaker that desires to learn English as a second language may access a foreign language learning application via an electronic device. In some cases, the foreign language learning application may access one or more cloud services, such as a content delivery system, to obtain a selection of English language titles that are also available in Japanese. The available titles may also include a difficulty level and a list of whether or not an English audio version of the title may be accessed in conjunction with the text version.

In one example, the native Japanese speaker may select a beginner title, such as a 1 on a difficult scale of 1 to 5 that has an accompanying English audio version. In some cases, the foreign language learning application may request or recommend some initial language learning settings for consuming the selected title. For example, the foreign language learning application may cause the native Japanese speaker to initial consume the title via the English audio version with text highlighting capabilities at a read rate of 0.5 that of a native English reader. Thus, the native Japanese speaker may have the title read out loud at a slow rate, while the native Japanese speaker reads along via the highlighted words. The foreign language learning application may also provide a recommended reading time per day to increase the native Japanese speaker English language absorption rate.

During each period the native Japanese speaker is consuming the selected English title, the foreign language learning application may collect feedback in order to assist the native Japanese speaker in improving their English language absorption rate. For example, the foreign language learning application may regularly, periodically, or in response to various triggers (e.g., the native Japanese speaker has re-read the same paragraph three or more times in a row, the native Japanese speaker has paused the audio on the same word five times, etc.) request that the native Japanese speaker rate the titles difficult, for instance as very easy, easy, just right, hard, or very hard. In some cases, the foreign language learning application may make recommendations based on the difficulty rating selected by the native Japanese speaker. For instance, if the native Japanese speaker rates the title as hard or very hard the foreign language learning application may recommend a further reduction in the read rate or that the highlighting function be re-enabled.

In some cases, the foreign language learning application may request the native Japanese speaker to rate the title in other ways. For example, the foreign language learning application may ask the native Japanese speaker if the title is too boring or uninteresting. If so, the foreign language learning application may recommend other titles to the native Japanese speaker that the foreign language learning application or other cloud services deem as more interesting for the native Japanese speaker. For example, the foreign language learning application or other cloud services may access user data associated with the native Japanese speaker to identify a title that may be more of interest to the native Japanese speaker. For example, the foreign language learning application or other cloud services may base an English language learning title based on past titles consumed by the native Japanese speaker, past rankings associated with the past titles, data associated with Japanese titles the native Japanese speaker has consumed, demographic information related to the native Japanese speaker, aggregate information about peers of the native Japanese speaker, etc.

Thus, the foreign language learning system including various cloud services and the foreign language learning application operating on the native Japanese speakers device gauge if the native Japanese speaker is consuming English content in an appropriate manner, at an appropriate difficulty, and with the appropriate interest and engagement to encourage improved absorption by the reader.

In some implementations, the user devices hosting the foreign language learning application may be in communication with a cloud-based or central server foreign language learning system that assists with facilitate the guided learning of each individual user, accepting, categorizing, and assigning of difficulty ranking to each title, delivering the foreign language learning titles to the user devices, syncing the audio as well as the different language text as the individuals consume the foreign language learning titles.

The cloud-based or network connected foreign language learning system may include various other systems for carrying out particular tasks associated with the guided learning system described herein. For instance, a content learning system may be configured to identify or receive content items from third party content provides (such as publishers, writers, authors, distributors, etc.). The content learning system upon receipt of a particular content item or title, contact one or more third party content providers in order to acquire the rights to distribute a foreign language version of the same content item (e.g., the English language content item and the Japanese language equivalent). The content learning system may also contact one or more third party audio content providers to acquire the rights to the audio version for the for the desired foreign language (e.g., for the native Japanese speaker learning English by consuming English titles the content learning system may obtain the rights to the English audio).

The foreign language learning system may also include foreign language learning content creation system to generate or curate additional content that may be useful in learning the foreign language while the titles are being consumed. For example, the foreign language learning content creation system may include a dictionary module or system that may obtain dictionary definitions and pronunciations for words associated with one or more titles in the language being acquired, such that the dictionary definitions and pronunciations may be provided to the reader as the foreign language learning content is being consumed to assist with reading comprehension.

The foreign language learning system may also include a content leveling system to rank a difficulty associated with reading a particular title. For example, the content leveling system may upon receipt of a content item, strip punctuation and case from the text of the content, tokenize whitespace and special characters, and identify individual words of the text. The content leveling system may then compare the identified words with one or more dictionaries, such as the New General Service List (NGSL), to identify the number or percentage of words in the text of the content item or title that are also present in the dictionary. The content leveling system may then make a determination as to the difficult of a particular content item based in part on the number of words appearing in the dictionary or the percentage of words in the dictionary. The content leveling system may also consider the length of the words, the length of the definitions, the number of definitions, the number of syllables, the length of the pronunciation key, etc.

The foreign language learning system may also include a foreign language metadata system to for example associated Japanese metadata to an English title in order to assist the native Japanese reader with selecting an English title of interest. For example, the foreign language metadata system may assign Japanese language identifies such as "神秘" (mystery), "ビクトリア時代" (Victorian era), or "女性主人公" female protagonist), among others. In this manner, the native Japanese reader may select titles of interest to the reader by previewing the Japanese tags rather than merely selecting a title with no concept of the subject matter or based on the native Japanese reader's current limited understanding of English.

In some cases, the foreign language learning system may also include a content delivery system. In the example, of the native Japanese speaker consuming English titles, the content delivery system may provide the English language text and Japanese langue text the native Japanese speaker's device. The content delivery system may also contact one or more third party audio content delivery systems to cause the third party audio content delivery system to stream the English language audio to the native Japanese speaker's device in coordination with the consumption of the English language text. In other cases, the content delivery system may monitor the delivery of the audio content via one or more synchronization files maintained on the native Japanese speaker's device.

In some particular implementations, the foreign language learning system may also include a content authorization system to determine if the native Japanese speaker is authorized to consume the foreign language learning content. For example, the authorization system may determine the native Japanese speaker has licensed the English text, the Japanese text, and the English audio before allowing the native Japanese speaker to consume the content.

FIG. 1 illustrates an example 100 depicting a device 102 hosting a foreign language learning application facilitating content consumption associated with foreign language learning. For example, as discussed above a native Japanese speaker may be consuming an English title, such as the United States Constitution in the illustrated example, in order to learn the English language. In this example, the native Japanese speaker is consuming the English title via the English text and English audio. For instance, the word "Representatives" 104 is currently highlighted causing the Japanese speaker to read the word "Representatives" 104 as the device output the audio pronunciation of the word "Representatives" 104. In this way, the native Japanese speaker both reads words and listening to the pronunciation in tandem.

In the illustrated example, the text of the English title is displayed in a first portion 108 of a display area 110. Thus, the native Japanese speaker may consume the text displayed in the first portion 108. From time to time, the native Japanese speaker may be presented by a number of selectable options 112-120 in a second portion 122 of the display area 110 to prompt the native Japanese speaker to rate the difficulty of the English title. For example, the foreign language learning application may prompt the native Japanese speaker to rate the title at various intervals. For example, the foreign language learning application may cause parodic ratings based on time (e.g., after a predetermined number of minutes have elapsed since the Japanese speak last rated the difficulty) or based on the amount of consumptions (e.g., after a predetermined number of words, sentences, phrases, paragraphs, or pages are consumed). In other cases, the foreign language learning application may initiate a rating of the title in response to various triggers or conditions being met. For instance, the foreign language learning application may prompt the native Japanese speaker to rate the difficulty if the Japanese speaker re-reads the same portion of text more than a threshold number of times, the Japanese speaker looks up a definition for a word more than a threshold number of times, the Japanese speaker pauses the audio output of the text more than a threshold number of times, etc.

In the illustrated example, the selectable option 112-120 may include a first selectable options 112 for the Japanese speaker to indicate the title is "very easy". In some cases, if the Japanese speaker selects the option 112 more than a threshold number of times, the foreign language learning application may present the native Japanese speaker with a list of options to improve foreign language learning. For example, the foreign language learning application may provide the user with recommendations to increase the audio output to closer to a normal read rate (e.g., changing from a read rate of 0.5 that of a native English reader to a read rate of 0.75 that of a native English reader), disabling highlighting or audio output, etc. In other cases, the foreign language learning application may cause a list of other recommended titles to appear on the display of the device 102 in response to the more than a threshold number of selection of the option 112. The list of recommended titles may have a higher difficulty level than the content currently being consumed, thereby causing the native Japanese speaker to attempt to master more difficult English works and accelerate the abortion of the English language.

Similarly, the illustrated example also includes a second selectable option 114 for the Japanese speaker to indicate the title is "easy". In some cases, if the Japanese speaker selects the option 114 and/or the option 112 more than a threshold number of times, the foreign language learning application may present the native Japanese speaker with a list of options to improve foreign language learning. For example, the foreign language learning application may provide the user with recommendations to increase the audio output to closer to a normal read rate (e.g., changing from a read rate of 0.5 that of a native English reader to a read rate of 1.0 that of a native English reader), disabling highlighting or audio output, etc. In other cases, the foreign language learning application may cause a list of other recommended titles to appear on the display of the device 102 in response to the more than a threshold number of selection of the option 114 and/or the option 112. The list of recommended titles may have a higher difficulty level than the content currently being consumed, thereby causing the native Japanese speaker to attempt to master more difficult English works and accelerate the abortion of the English language.

In the illustrated example, the selectable options 112-120 may include a third selectable option 116 for the Japanese speaker to indicate the title is "just right". In some cases, in response to a user selection of option 116, the foreign language learning application may cause the device to return to outputting the English text in the manner that the native Japanese speaker was previously consuming the content.

In the illustrated example, the selectable option 112-120 may include a fourth selectable options 118 for the Japanese speaker to indicate the title is "hard". In some cases, if the Japanese speaker selects the option 118 more than a threshold number of times, the foreign language learning application may present the native Japanese speaker with a list of options to improve foreign language learning. For example, the foreign language learning application may provide the user with recommendations to decrease the audio output to a slower read rate (e.g., changing from a read rate of 0.75 that of a native English reader to a read rate of 0.5 that of a native English reader), enabling highlighting or audio output, etc. In other cases, the foreign language learning application may cause a list of other recommended titles to appear on the display of the device 102 in response to the more than a threshold number of selection of the option 118. The list of recommended titles may have a lower difficulty level than the content currently being consumed, thereby causing the native Japanese speaker to attempt to master easier English works and accelerate the abortion of the English language.

Similarly, the illustrated example also includes a second selectable option 120 for the Japanese speaker to indicate the title is "too hard". In some cases, if the Japanese speaker selects the option 120 and/or the option 118 more than a threshold number of times, the foreign language learning application may present the native Japanese speaker with a list of options to improve foreign language learning. For example, the foreign language learning application may provide the user with recommendations to decrease the audio output to a slower read rate (e.g., changing from a read rate of 1.0 that of a native English reader to a read rate of 0.5 that of a native English reader), enabling highlighting or audio output, etc. In other cases, the foreign language learning application may cause a list of other recommended titles to appear on the display of the device 102 in response to the more than a threshold number of selection of the option 120 and/or the option 118. The list of recommended titles may have a lower difficulty level than the content currently being consumed, thereby causing the native Japanese speaker to attempt to learn more effectively from the easier English works and accelerate the abortion of the English language.

In some implementations, such as the illustrated example, the foreign language learning application may cause an additional selectable option 124 to be displayed with the options 112-120. In the illustrated example, the selectable option 124 is displayed in a third portion 126 of the display area 110, however, in other examples, the option 124 may be displayed together with the options 112-120. In general, the option 124 may allow the native Japanese speaker to indicate that the current title is uninteresting or boring. Since it is likely that the native Japanese speaker will have better success at foreign language learning if the Japanese speaker enjoys the content being consumed.

In some implementations, the option 124 may remain available during the entire time the title is displayed. However, in other cases, the option 124 may be presented together with the options 112-120. In some cases, if the native Japanese speaker selects the option 124, a list of recommended titles may be displayed in the display area 110. In some cases, the foreign language learning application may make the title selections based on information known to the application, such as previously consumed titles, user data, or data obtained from other applications operating on the device 102. In other cases, the foreign language learning application may request the list of titles from one or more cloud services. For example, the cloud services may include a content recommendation system that may utilize information known about the particular native Japanese speaker as well as information aggregated about various other Japanese speakers, other English speakers, third language speakers, the various English titles, various Japanese titles, other information, or a combination thereof.

In some particular examples, an option 128 may be present on the display to imitate the difficult selection process or open the second portion 122 of the display 108. In this manner, if the user feels that the title is to easy or too difficult, the user may open the section portion 122 to cause the froing language learning application to adjust one or more settings, modes, or the title itself, as described above.

In the current example, the text of the English content being consumed is in English (e.g., the language being learned), while the text of the options 112-120 and 124 in the second portion 122 and the third portion 126 are in Japanese. Thus, the native Japanese speaker is able to read the questions and options that the foreign language learning application utilized to provided guided learning but allows the native Japanese speaker to read the text of the content in English to facility the foreign language learning.

Figure 2:
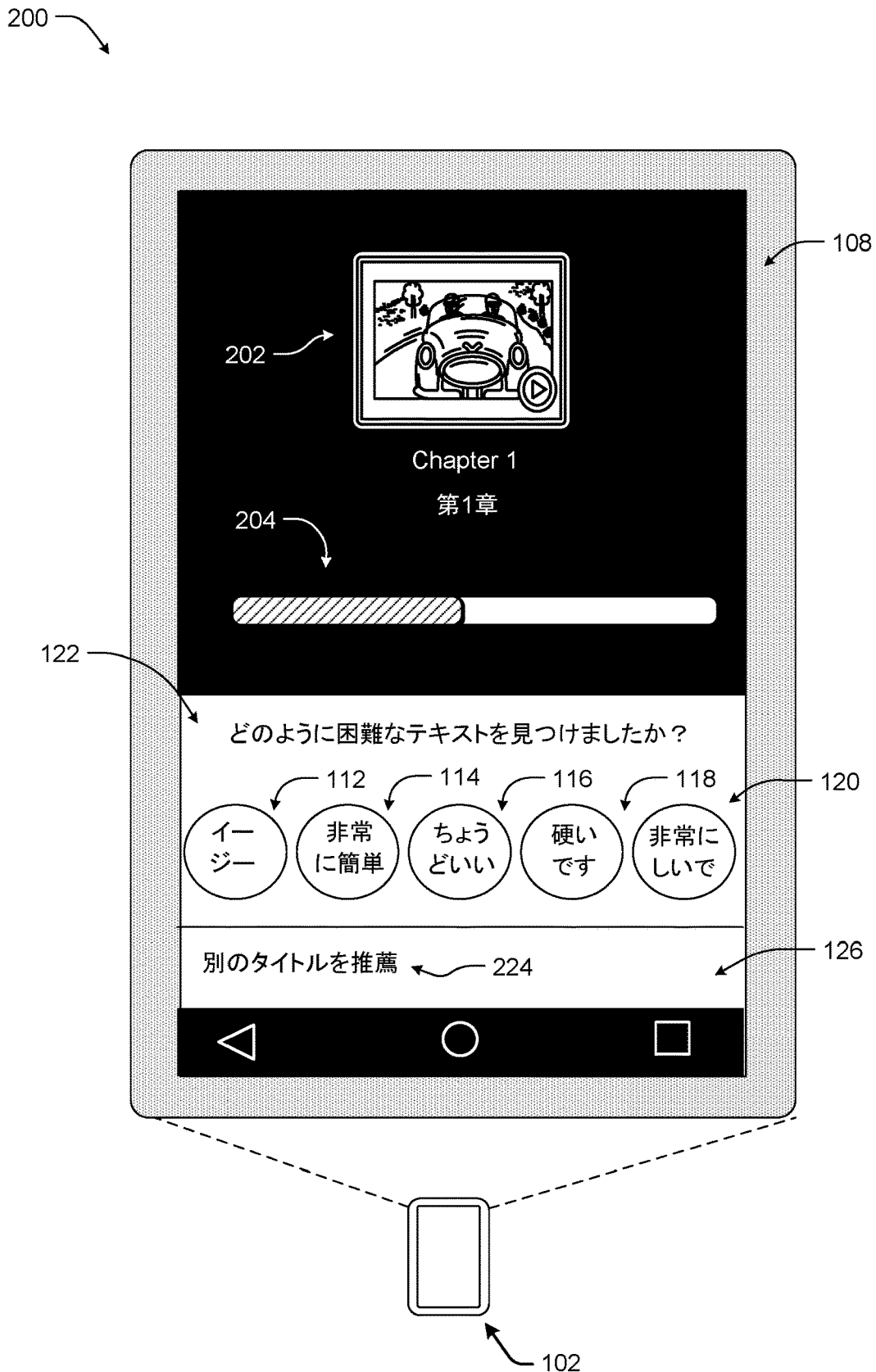
FIG. 2 illustrates another example depicting a device facilitating content consumption associated with foreign language learning.

FIG. 2 illustrates another example 200 depicting a device 102 facilitating content consumption associated with foreign language learning. In the example, illustrated with respect to FIG. 1, the foreign language learning application is set to a read and listen mode. In the current illustrated example of FIG. 2, the foreign language learning application is set to a listen only mode.

In the illustrated example, the foreign language learning application is in the listen only mode. Thus, the text of the English title is not displayed in the first portion 108 of the display area 110. Rather, an icon or picture 202 (e.g., the physical book cover) representing the title and a progress bar 204 depicting the native Japanese speaker's progress through the English tittle are shown.

As described above, at various points, the native Japanese speaker may be presented by a number of selectable options 112-120 in a second portion 122 of the display area 110 to prompt the native Japanese speaker to rate the difficulty of the English title. For example, the foreign language learning application may prompt the native Japanese speaker to rate the title at various intervals. For example, the foreign language learning application may cause parodic ratings based on time (e.g., after a predetermined number of minutes have elapsed since the Japanese speak last rated the difficulty) or based on the amount of consumptions (e.g., after a predetermined number of words, sentences, phrases, paragraphs, or pages are consumed). In other cases, the foreign language learning application may initiate a rating of the title in response to various triggers or conditions being met. For instance, the foreign language learning application may prompt the native Japanese speaker to rate the difficulty if the Japanese speaker re-reads the same portion of text more than a threshold number of times, the Japanese speaker looks up a definition for a word more than a threshold number of times, the Japanese speaker pauses the audio output of the text more than a threshold number of times, etc.

In this example, the options 112-120 respectively correspond to ratings of "too easy," "easy," "just right," "hard," and "too hard". As discussed above, a selection of one or more of the options 112-120 more than a threshold number of times may cause the foreign language learning application operation on the device 102 to present within the display area 110, one or more recommendations to improve the foreign language learning by the native Japanese speaker. For example, in response to a selection of the option 112 "too hard", the foreign language learning application may suggest switching to listen and read mode shown in the illustrated example of FIG. 1.

In some instances, in addition to rating a difficulty level of the title, the options 112-120 may rate the title on additional criteria. For example, in some cases, a first set of options may be displayed to rate the difficulty of the grammar, a second set of options may be displayed to rate the difficulty of the words, or a third set of options may be displayed to rate the difficulty of the subject matter. In other examples, the second options 122 may include options to rate interest level, narration speed or read rate, vocabulary, comprehension, etc.

Figure 3:
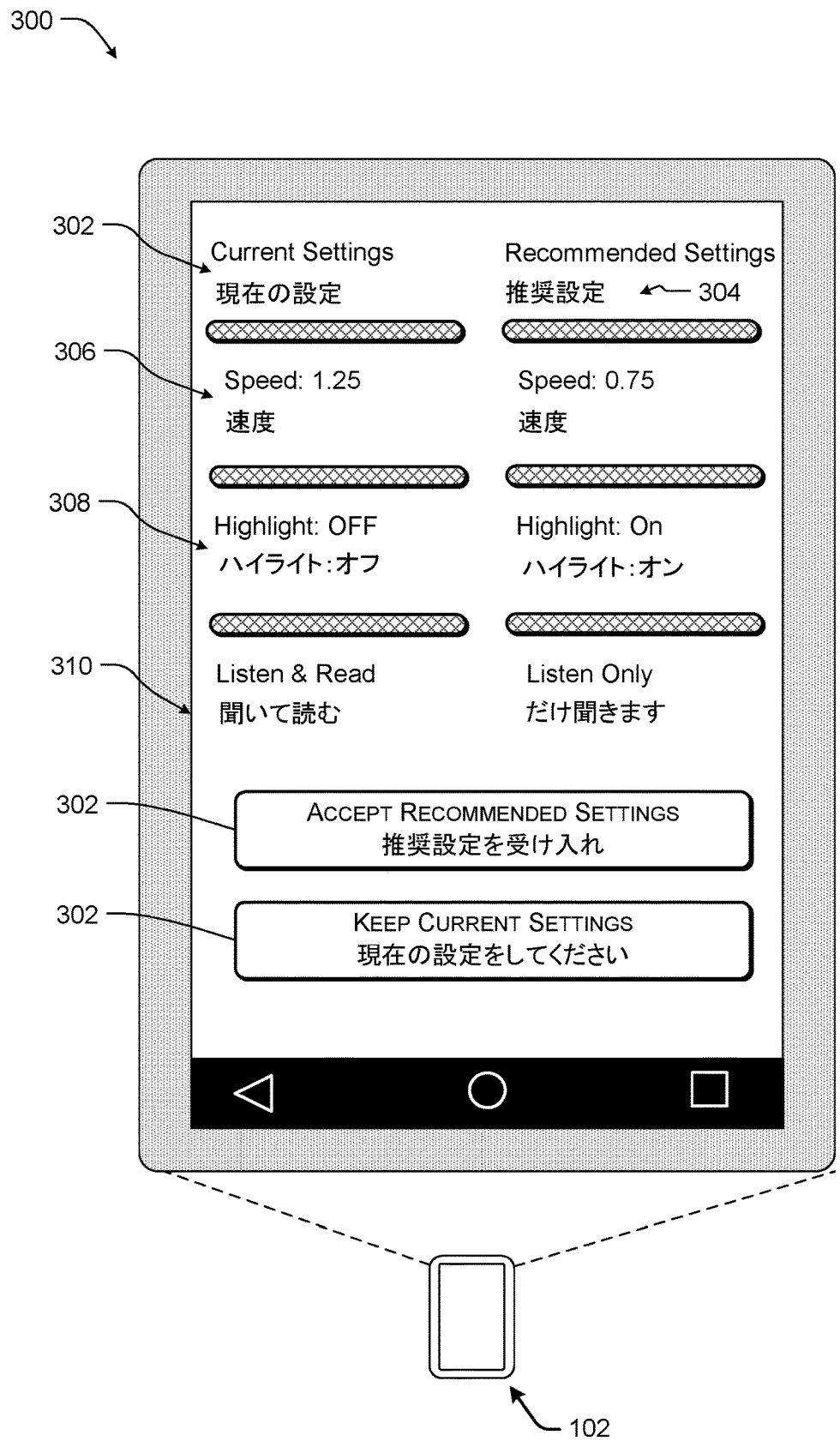
FIG. 3 illustrates an example depicting recommended adjustments to improve foreign language absorption by a user.

FIG. 3 illustrates an example 300 depicting recommended adjustments to improve foreign language absorption by a user. For example, the foreign language learning application or a cloud based service associated with the foreign language learning application may present to the user, such as the native Japanese speaker, with recommendations to increase or decrease the difficulty associated with consuming foreign language content. In some cases, the foreign language learning application may present or display the recommendations in response to the user selecting one or more of the selectable options 112-120 of FIGS. 1 and 2. In other cases, the 112-120 the foreign language learning application may present or display the recommendations in response to detecting various criteria indicative of difficulty or ease associated with the user consuming the foreign language content. For instance, if the foreign language learning application detects that the user has re-read the same portion of the foreign language content more than a threshold number of times. It should be understood, in some implementations, the foreign language learning application may provide data related to the user consumption of the foreign language content and one or more cloud services may determine the user difficulty or ease associate with consuming a particular the foreign language content.

In the illustrated example, the device 102 is presenting the user with the current settings 302 on the right side of the display and recommended settings on the left side of the display. In this example, the user may have selected that the title was too difficult and the foreign language learning application is suggesting three recommendations. The first recommendation 306 is to reduce the output of the audio content from a read rate of 1.25 that of a normal reader to a read rate of 0.75 that of a normal reader. By reducing the read rate of the audio content the user may experience improved compression and, thereby, improved absorption of the foreign language. The second recommendation 308 is to enable the highlight function to assist the user with reading along with the audio output of the foreign language content and to, thereby, improve the user's absorption of the foreign language. The third recommendation 310 is to switch from a read and listen mode to a listen only mode to concentrate on listening comprehension and, thereby, improve the absorption of the foreign language. While the current example illustrates three recommendations that may be presented to the user, it should be understood that the foreign language learning system including the foreign language learning application and one or more cloud based services may present the user with any number or type of recommendation to improve the user learning experience. Additionally, while the recommendations 306-310 in the illustrated example are to reduce the difficulty associated with comprehending the foreign language content, the system may also present recommendations to increase the difficulty of the foreign language content when the user indicates or the system determines the title is too easy for the user.

In some particular implementations, the system including the foreign language learning application and one or more cloud based services may determine the particular recommendation or the time at which to present the particular recommendations based on a number of criteria. For example, the criteria may include data known about the user, the user's settings, or device settings, such as the user's current comprehension of the foreign language, user's test scores and types associated with the foreign language, the currently selected title difficulty level or user entered experience level, number of words the user has marked or unmarked as difficult or as study words, number of words marked as mastered, number of words the user stopped and looked up, number of times the user accessed dictionary definitions or audio pronunciations of words, time spent reviewing dictionary definitions, relationship between words looked up or marked as difficult/mastered, number of pauses, number of audio replays, number of toggles between read and listen mode and listen only mode, current word selected when user switches between read and listen mode and listen only mode, narration speed or read rate associated with the title, among others. In other examples, the criteria may include data aggregated over users, such as number of users that utilized highlighting function for a particular title, difficult assigned by each user to the title, number of words looked up across all users for a particular title, the specific words looked up across users, number of audio pronunciations across user for a particular title, dictionary definitions accessed across users for a particular title, particular words marked as mastered or difficult across users, average or median read time across users for a particular title, average or median listening time across users for a particular title, number of times a user abounded a title prior to completion across users, etc.

In some cases, the system including the foreign language learning application and one or more cloud based services may utilize combination thresholds including one or more of the criteria listed above and/or additional criteria to determine recommendations for a particular user or the time at which to present a recommendation to the particular user. For example, the combination threshold may include number of words looked up, number of audio playback restarts, and a number of pauses.

The system including the foreign language learning application and/or one or more cloud based services may utilize a number of call to actions to prompt the user for input and based at least in part on the user input to generate the recommendations. For example, the system may present the user with one or more quizzes (e.g., a vocabulary quiz, grammar quiz, word quiz, subject matter understanding quiz, etc.), prompt the user to rate the difficulty of the title as described above with respect to FIGS. 1 and 2, prompt the user as to interest of the subject matter of the foreign language title, among others.

While the illustrated example provides three types of recommendations, it should be understood that many other types of recommendations may be presented to the user by the foreign language learning application. For example, the recommendations may relate to grammar, quizzes, speaking drills, speech shadowing, vocabulary filters, dictionary filters or features, among others.

Figure 4:
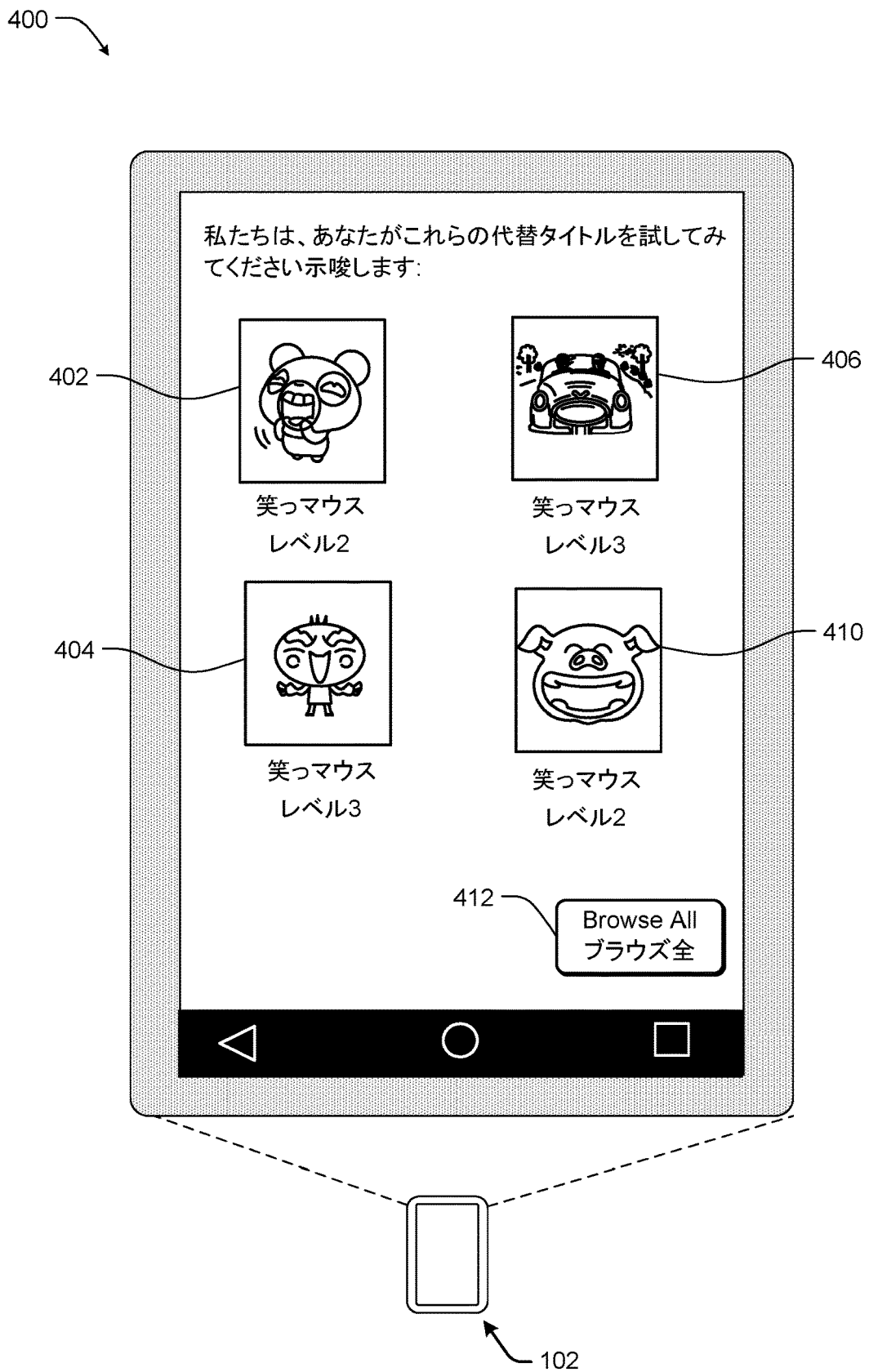
FIG. 4 illustrates an example depicting recommended alternative content items to improve foreign language absorption by a user

FIG. 4 illustrates an example 400 depicting recommended alternative content items to improve foreign language absorption by a user. For example, as described above with respect to FIG. 1, the foreign language learning application may cause one or more selectable options to be displayed to allow the user to indicate that the current title is uninteresting or boring. As discussed above, since it is likely that the user will have better success at foreign language learning if the user enjoys the content being consumed, the foreign language learning system including the foreign language learning application and/or one or more cloud based services may recommend other titles to the user at the same or similar difficulty level, as shown in the illustrated example.

For instance, the system may cause a number of recommended titles, generally indicated by 402-410, to be displayed including cover art, title, and a short description in the native language (e.g., in the illustrated example Japanese). In this manner, the user is able to select a title that may be more of interest to them and thus the system may encourage the user to find the foreign language learning experience more satisfying and enjoyable. In some cases, the system may select the recommended titles based at least in part on chapter titles, search terms or other metadata assigned by for instance the foreign language metadata system upon intact of the content item from a publisher, content difficulty level, aggregated data across users on selected titles, completed titles, abandoned titles (e.g., titles that the reader failed to finish), recent browsing or content item selection, time spent on similar titles, combinations thereof, or other recommendation criteria.

In some cases, the recommended titles 402-410 may still not be of interest to the user. In these cases, the device 102 may also display a browser all selectable option 412 to allow the user to access a category or index that may have content items sorted by, for instance, subject matter, genera, author, title, etc.

Figure 5:
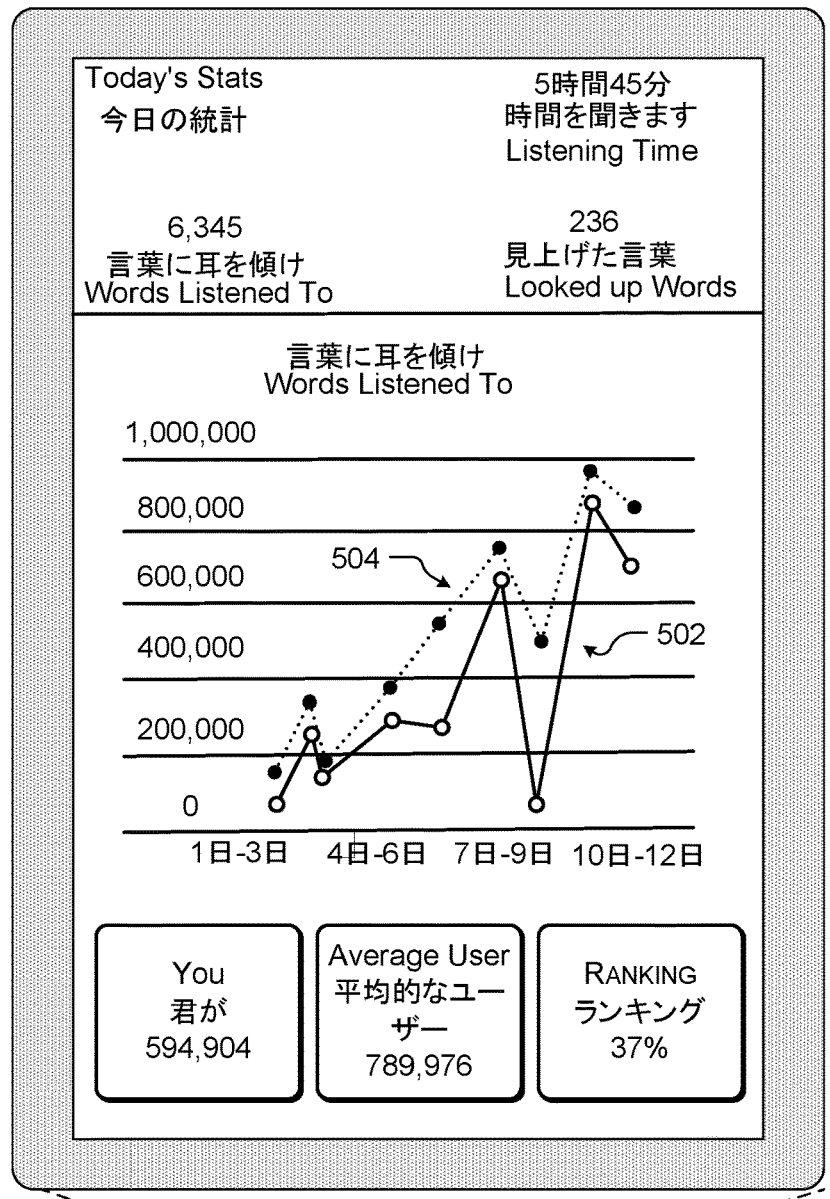
FIG. 5 illustrates an example depicting user progress associated with the foreign language learning.
Figure 5:
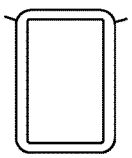

FIG. 5 illustrates an example 500 depicting user progress associated with the foreign language learning. For example, the foreign language learning system including the foreign language learning application and/or one or more cloud based services may track or monitor a user's progress or time spent consuming foreign language content. In this manner, the system may provide the user with feedback as to current progress and/or expected progress. In some instance, as in the illustrated example 500, the system may track time spent, while in other instance, the system may periodically quiz the user or generate progress indicators based on a number of measured factors. For example, the system may track the user progress by measuring the number of words the user has marked or unmarked as difficult or as study words, number of words marked as mastered, number of words the user stopped and looked up, number of times the user accessed dictionary definitions or audio pronunciations of words, time spent reviewing dictionary definitions, relationship between words looked up or marked as difficult/mastered, number of pauses, number of audio replays, number of toggles between read and listen mode and listen only mode, current word selected when user switches between read and listen mode and listen only mode, narration speed or read rate associated with the title, among others.

In the illustrated example 500, the system has measured the number of words the user listened to and causes the device 102 to display solid line 502 showing the number of words the user listened to over multiple three week periods. The system has also tracked and measured a number of words an average user has listened to and displayed, the average user's progress via dotted line 504. As shown, the current user has listened to less words on a week by week basis and overall than the average user so may have less than ideal foreign language absorption.

In some cases, the system may also cause the device 102 to display the number of words listened to, the number of words an average user has listened to, and the user's percentile over all users. In this manner, the user is able to determine if the user is on track with other users having the same native language and learning the same language (such as in the example above other native Japanese speakers learning English).

Figure 6:
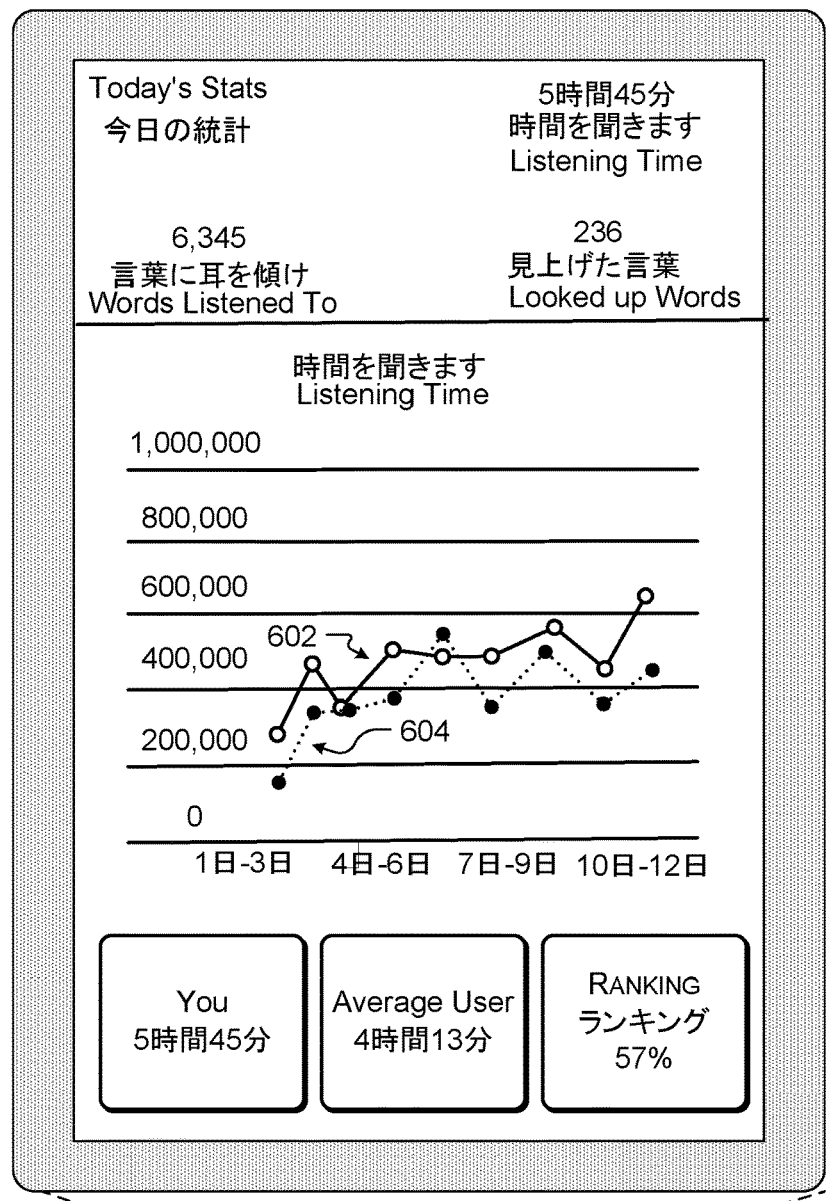
FIG. 6 illustrates another example depicting user progress associated with the foreign language learning.

FIG. 6 illustrates another example 600 depicting user progress associated with the foreign language learning. For example, the foreign language learning system including the foreign language learning application and/or one or more cloud based services may track or monitor a user's progress or time spent consuming foreign language content. In this manner, the system may provide the user with feedback as to current progress and/or expected progress. In some instance, as in the illustrated example 600, the system may track time spent, while in other instance, the system may periodically quiz the user or generate progress indicators based on a number of measured factors. For example, the system may track the user progress by measuring the number of words the user has marked or unmarked as difficult or as study words, number of words marked as mastered, number of words the user stopped and looked up, number of times the user accessed dictionary definitions or audio pronunciations of words, time spent reviewing dictionary definitions, relationship between words looked up or marked as difficult/mastered, number of pauses, number of audio replays, number of toggles between read and listen mode and listen only mode, current word selected when user switches between read and listen mode and listen only mode, narration speed or read rate associated with the title, among others.

In the illustrated example 600, the system has measured time the user spent listening to audio associated with the foreign learning content and causes the device 102 to display solid line 602 showing the time over multiple three week periods. The system has also tracked and measured listening time of an average user and displayed, the average user's progress via dotted line 604. As shown, the current user has listened longer than the average user most weeks as well as overall.

In some cases, the system may also cause the device 102 to display the listening time of the user, the average user, and the user's percentile over all users. In this manner, the user is able to determine if the user is on track with other users having the same native language and learning the same language (such as in the example above other native Japanese speakers learning English).

Figure 7:
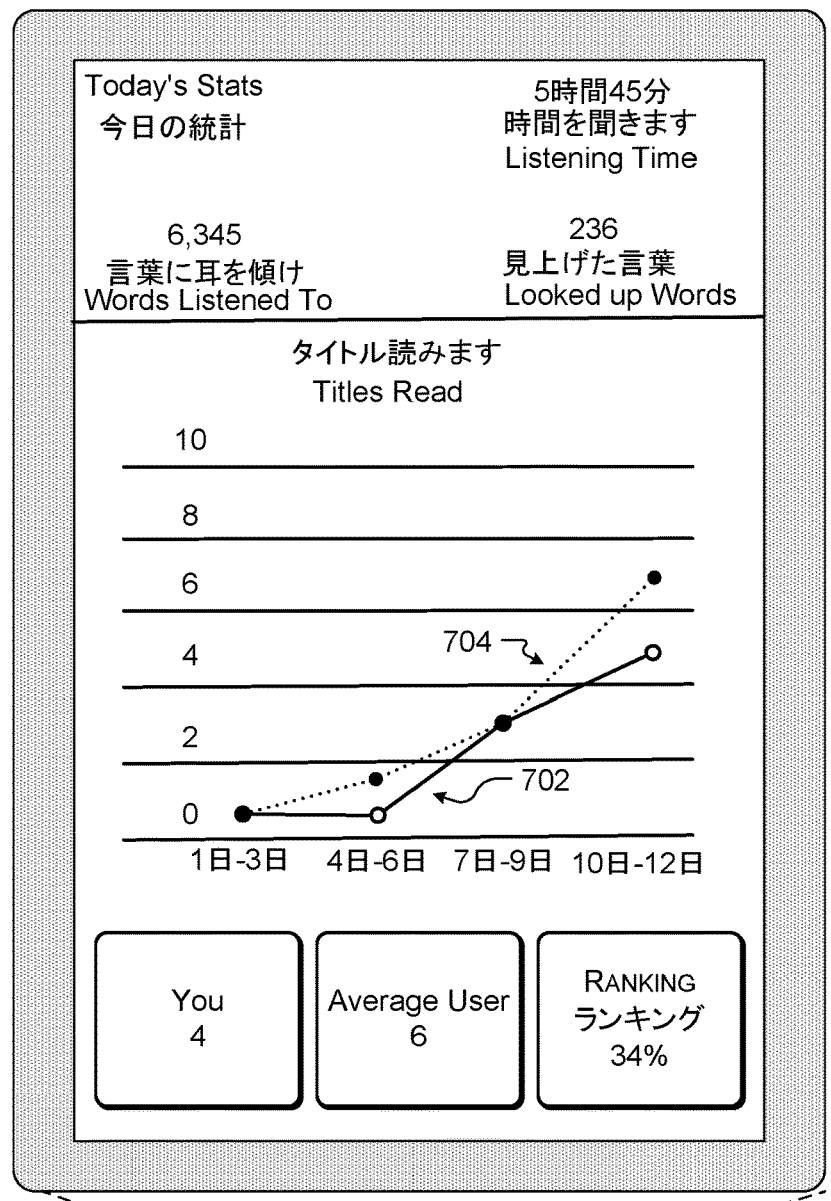
FIG. 7 illustrates yet another example depicting user progress associated with the foreign language learning.
Figure 7:
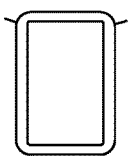

FIG. 7 illustrates yet another example 700 depicting user progress associated with the foreign language learning. For example, the foreign language learning system including the foreign language learning application and/or one or more cloud based services may track or monitor a user's progress or time spent consuming foreign language content. In this manner, the system may provide the user with feedback as to current progress and/or expected progress. In some instance, as in the illustrated example 700, the system may track time spent, while in other instance, the system may periodically quiz the user or generate progress indicators based on a number of measured factors. For example, the system may track the user progress by measuring the number of words the user has marked or unmarked as difficult or as study words, number of words marked as mastered, number of words the user stopped and looked up, number of times the user accessed dictionary definitions or audio pronunciations of words, time spent reviewing dictionary definitions, relationship between words looked up or marked as difficult/mastered, number of pauses, number of audio replays, number of toggles between read and listen mode and listen only mode, current word selected when user switches between read and listen mode and listen only mode, narration speed or read rate associated with the title, among others.

In the illustrated example 700, the system has measured the number of title read by the user and causes the device 102 to display solid line 702 showing the number of titles over multiple three week periods. The system has also tracked and measured the number of titles an average user has read within the same period or at the same compression level and displayed, the average user's progress via dotted line 704. As shown, the current user has listened longer than the average user most weeks as well as overall.

In some cases, the system may also cause the device 102 to display the number of titles read by the user, the average user, and the user's percentile over all users. In this manner, the user is able to determine if the user is on track with other users having the same native language and learning the same language (such as in the example above other native Japanese speakers learning English).

While FIGS. 5-7 illustrate three examples related to providing user metric data, it should be understood that many other metrics may be tracked and presented to the user. For example, the foreign language learning application may track number of words mastered, words removed from the study word list or difficult word list, words added to the mastered words list, number of words looked up via a dictionary function, number of idioms encountered, number of compound words encountered, number of polysemous words encountered, number of words with more than a predetermined number of characters encountered, number of antiquated words encountered, number of loanwords encountered, number of sentences having more than a predetermined number of words, number of quizzes or tests taken and any data or results related thereto, number of speaking drills preformed, number of practice modules consumed, among others. The foreign language learning application may also, for example, provide metrics related to descriptive content and action oriented content as well as sentence structure and complexity of content consumed.

Figure 8:
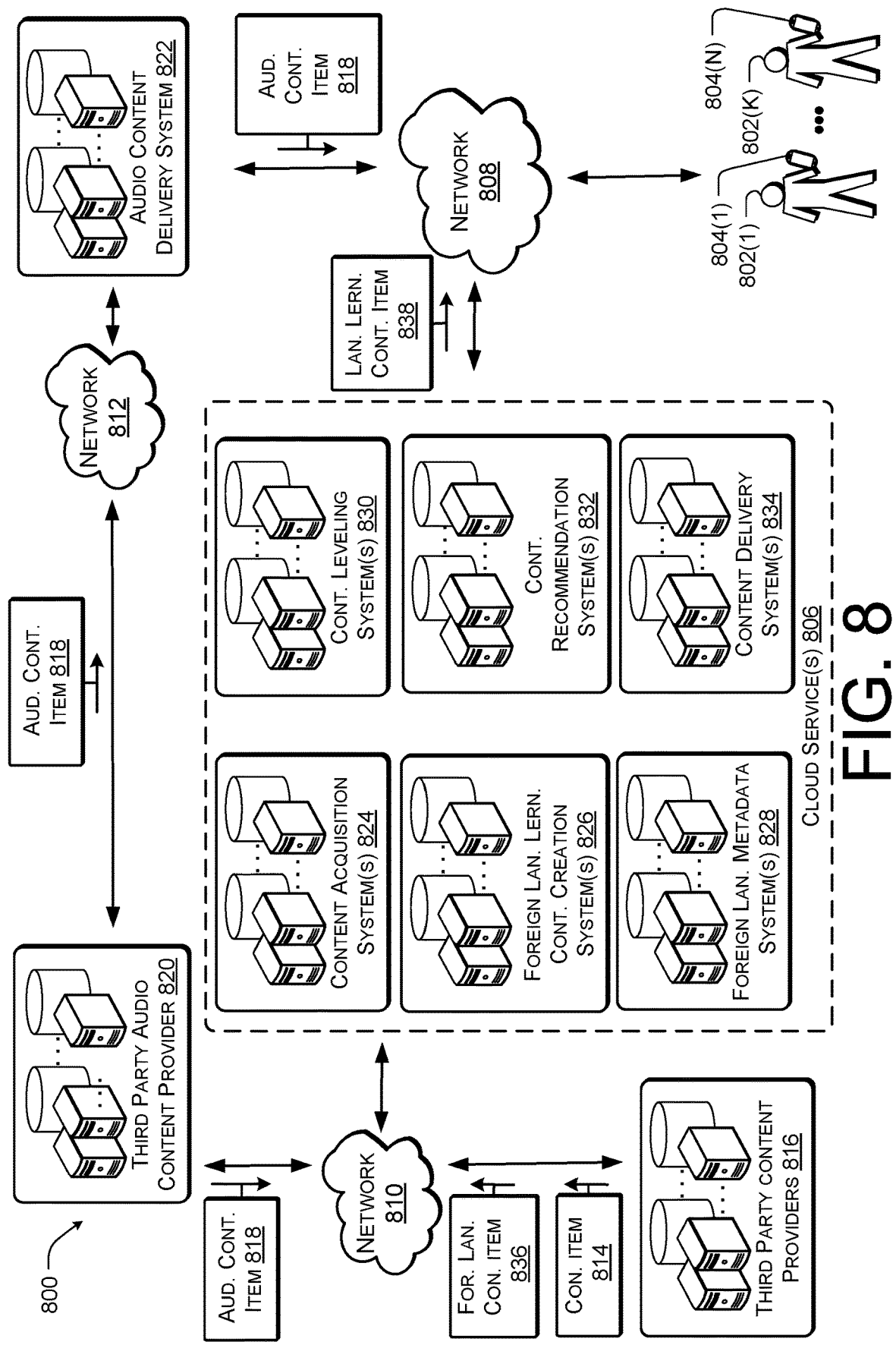
FIG. 8 illustrates an example architecture of a system for providing language learning content to a user device.

FIG. 8 illustrates an example architecture of a system 800 architecture for providing language learning content to one or more users 802(1)-(K) (e.g., the native Japanese speaker described above) via corresponding user devices 804(1)-(N). In the illustrated example, the users 802(1)-(K) access the foreign language learning system 800 via the user devices 804(1)-(K) but are communicatively coupled to remote cloud services 806 accessible via a network, generally indicated by 808, for providing the foreign learning content. The remote cloud services 806 may also receive assistance from various other third party systems via one or more networks, generally indicated by 810 and 812. For example, the cloud services 806 may receive content items 814 from one or more third party content providers 816 and audio content items 818 corresponding to the content items via third party audio content providers 820. The system 800 may also utilize one or more audio content delivery systems 822 to provide the audio content 818 to the user devices 804.

In the illustrated example, the device 804(1)-(K) are shown as a handheld computing device but it should be understood that the devices 804 may be implemented as any type of electronic device capable of presenting information to a user and receiving user input in response. For example, the devices 804 may include electronic devices, cell phones, smart phones, tablets, general purpose computers, notebook computers, desktop computers, electronic readers, among other type of known computing devices.

The networks 808, 810, and 812 may be representative of wired technologies (e.g., wires, USB, fiber optic cable, etc.), wireless technologies (e.g., RF, cellular, satellite, Bluetooth, etc.), or other connection technologies. The networks 808, 810, and 812 may be representative of any type of communication network, including data and/or voice network, and may be implemented using wired infrastructure (e.g., cable, CATS, fiber optic cable, etc.), a wireless infrastructure (e.g., RF, cellular, microwave, satellite, Bluetooth, etc.), and/or other connection technologies. The networks 808, 810, and 812 carry data between the third party providers 816, 820, and 822, the cloud services 806, and/or the user devices 804.

The cloud services 806 generally refer to a network accessible platform implemented as a computing infrastructure of processors, storage, software, data access, and so forth that is maintained and accessible via a network such as the Internet. The cloud services 806 do not require end-user knowledge of the physical location and configuration of the system that delivers the services. Common expressions associated with cloud services 806 include "on-demand computing," "software as a service (SaaS)," "platform computing," "network accessible platform" and so forth.

In the illustrated example, the cloud services 806 include various systems that may perform actions associated with the foreign language learning system. For instance in the illustrated example, the cloud services 806 includes a content acquisition system 824, a foreign language learning content creation system 826, a foreign language metadata system 828, a content leveling system 830, a content recommendation system 832, and a content delivery system 834.

The content acquisition system 824 may be configured to identify or receive content items from the third party content provides 816 (such as publishers, writers, authors, distributors, etc.). The content acquisition system 824 upon receipt of a particular content item 814 or title, contact one or more third party content providers 816 in order to acquire the rights to distribute a foreign language content item 836 (e.g., the foreign version of the same content item 814, such as the Japanese language equivalent of an the English language content item). The content acquisition system 824 may also contact one or more third party audio content providers 820 to acquire the rights to the audio version for the for the desired foreign language.

The foreign language learning content creation system 826 generate or curate additional content that may be useful in learning the foreign language while the content items 814 are being consumed. For example, the foreign language learning content creation system 826 may include a dictionary module or system that may obtain dictionary definitions and pronunciations for words associated with the content items 814 in the language being acquired. The foreign language learning content creation system 826 may also be configured to combine the content item 814 and the foreign language content item 836 together with the curated content as the foreign language learning content 838, such that the dictionary definitions and pronunciations may be provided to the reader with the native language text and the foreign language text of the content item to assist with reading comprehension. In other cases, the dictionary definitions and/or pronunciations may be delivered ad hoc at the time the user looks up the word via another of the cloud services 806 such as a dictionary system (not shown) and/or additional third party dictionary providers (not shown).

The foreign language metadata system 828 may be configured to, for example, associated foreign language metadata to the content item 814 in order to assist the foreign language reader with selecting a title of interest. For example, the foreign language metadata system 828 may assign language identifies associated with genre, characters, plot, subject matter, title, etc. In the foreign language to assist with title selection. In this manner, the foreign language reader may select titles of interest by previewing the foreign language tags rather than merely selecting a title with no concept of the subject matter or based on the foreign reader's current limited understanding of language being acquired.

The content leveling system 830 may be configured to rank a difficulty associated with reading a particular content item 814. For example, the content leveling system 830 may upon receipt of a content item 814, strip punctuation and case from the text of the content item 814, tokenize whitespace and special characters, and identify individual words of the text. The content leveling system 830 may then compare the identified words with one or more dictionaries, such as the NGSL, to identify the number or percentage of words in the text of the content item 814 or title that are also present in the dictionary. The content leveling system 830 may make a determination as to the difficult of a particular content item 814 based in part on the number of words appearing in the dictionary or the percentage of words in the dictionary. The content leveling system 830 may also consider the length of the words, the length of the definitions, the number of definitions, the number of syllables, the length of the pronunciation key, etc.

The content recommendation system 832 may be configured to recommend language learning content items 836 that may be of interest to particular readers acquiring the foreign language. In some cases, the content recommendation system 832 may select the recommended titles based at least in part on information known about the reader (e.g., previously consumed titles in the foreign language and/or in the readers native language, titles abandoned by the user, user survey data, user settings, user browsing history, search history, time spent on similar titles etc.), information known about the language learning content, items 836 (e.g., chapter titles, native language metadata tags, foreign language metadata tags, publisher information, subject matter, content difficulty level, etc.), as well as information aggregated across users (e.g., user comments, what other content items or titles were consumed by readers that completed the recommend language learning content items 836, etc.) current on selected titles, completed titles, abandoned titles (e.g., titles that the reader failed to finish).

The content delivery system 834 may assist with delivering the language learning content items 836 and synchronizing the audio output provided by the third party audio content delivery system 822 at the user device 804. For example, the content delivery system 834 may facility downloading or streaming of the language learning content items 836 to the user device 804. The content delivery system 834 may also receive notifications from the user device 804 when the user is consuming the language learning content items 836 and, for instance, via the notification the content delivery system 822 may monitor the output of the audio content 818 with the language learning content items 836 to ensure the output is synchronized. In one particular example, the content delivery system 834 may periodically receive sync files including information related to the output of the streamed audio content item 818 and the output of the language learning content items 836. The content delivery system 836 may modify the sync files and return to the device 804 if the audio content item 818 and the language learning content items 836 are out of alignment. The foreign language learning application operation on the device 804 may then utilize the modified sync files to re-synchronize the audio content item 818 and the language learning content items 836.

In one example, the third party audio content provider 816 may upload a content item 814 (such as an English title) to the foreign language learning cloud services 806. The content acquisition system 824 associated with the cloud service 806 may an additional third party content provider 816 to determine if the foreign language content item exists (e.g., the Japanese language version) and to obtain the rights to distribute with the content item 814. The content acquisition system 824 may also contact one or more third party audio content providers 820 to acquire the rights to the audio content item 818 (e.g., the audio English book) of the content item 814.

Once the content item 814, the audio content item 818, and the foreign language content item 836 are acquired by the content acquisition system 824 from the content providers 816, 820, and 822, the foreign language learning content creation system 826 may generate or curate additional content that may be useful in learning the foreign language. The foreign language learning content creation system 826 may then combine the content item 814 and the foreign language content item 836 together with the curated content as the foreign language learning content 838.

The foreign language metadata system 828 may assign foreign language (e.g., Japanese language metadata) to the foreign language learning content 838 to assist the foreign language reader (e.g., the Japanese reader) with selecting a title of interest. Similarly, the content leveling system 830 may ranks a difficulty associated with reading the content item 814. For example, the content leveling system 830 may upon receipt of a content item 814, strip punctuation and case from the text of the content item 814, tokenize whitespace and special characters, and identify individual words of the text. The content leveling system 830 compares the identified words with one or more dictionaries, such as the NGSL, to identify the number or percentage of words in the text of the content item 814 or title that are also present in the dictionary and determine a difficult level based in part on the number of words appearing in the dictionary or the percentage of words in the dictionary. The difficult level may then be assigned to the foreign language learning content 838.

A user 802 (e.g., the native Japanese speaker) may request to access the foreign language learning content 838 in order to acquire the foreign language (e.g., English). The content delivery system 834 may stream or download the foreign language learning content 838 to the user device 804 corresponding to the user 802. The content delivery system 834 may also contact the audio content delivery system 822 to stream the audio content item 818 to the user device 804 in synchronization with the consumption of the foreign language learning content 838 by the user 802. Alternatively, when the user 802 access the foreign language learning content 838, the device 804 or the foreign language learning application operating on the device 804 may both access the audio content delivery system to the streaming audio content item 818 to the device and provide synchronization files to the content delivery system 834. The content delivery system 834 monitors and modifies the synchronization files to ensure the audio content item 818 is synchronized with the foreign language learning content 838.

As the user 802 is consuming the foreign language learning content 838, the user 802 may decide the foreign language learning content 838 is uninteresting. The user 802 may select an option presented on the device 804 (as described above with respect to FIGS. 1-4) to indicate that the title is uninteresting. In response, the foreign language learning application operating on the device 102 may notify the content recommendation system 832 to provide recommended titles to present to the user 802. The content recommendation system 832 may select the recommended titles based at least in part on information known about the reader, information known about the language learning content, information known about the foreign language learning content item 836 and or items, information aggregated across users, among others. The device 804 may present the recommended content items to the user 802 together with foreign language metadata tags and the user 802 may select one that is of interest to the user 802.

As the user 802 is consuming the foreign language learning content 838, the user 802, the foreign language learning application, or the cloud based services 806, such as a difficulty monitoring system (not shown), may decide the foreign language learning content 838 is too difficult or too easy. In response, the foreign language learning application or the difficulty monitoring system may present the user 802 with options to alter the difficulty associated with consuming the foreign language learning content 838. For example, the foreign language learning application or the difficulty monitoring system may recommend a change to the read rate, a change to the highlighting or read along (audio output) of the content item, etc. In some particular implementations, the system 800 may also recommend different content item at different difficulty levels when the system 800 determines the foreign language learning content 838 being consumed is at the wrong difficulty level.

Figure 9:
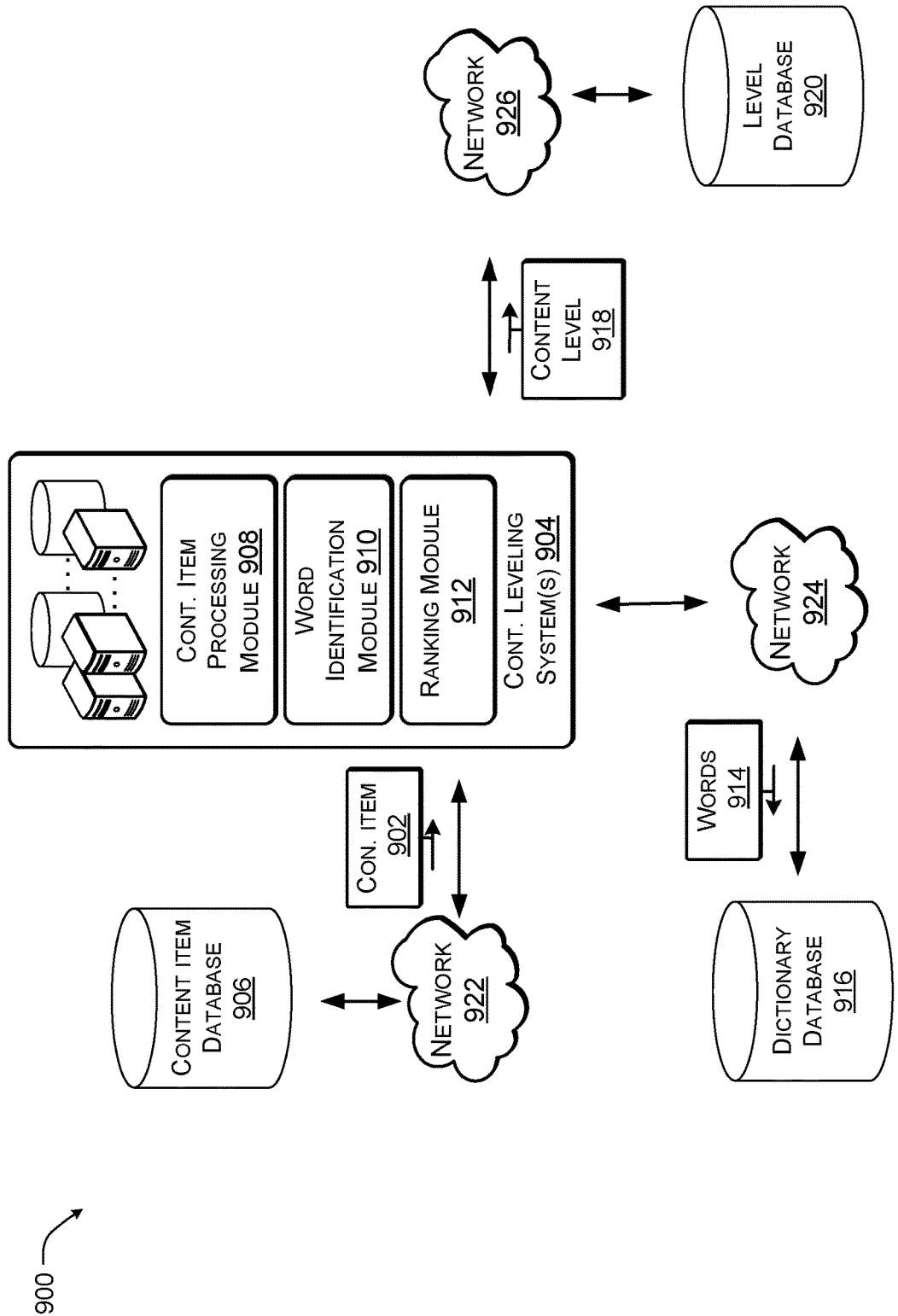
FIG. 9 illustrates an example architecture of a system for ranking a difficulty of language learning content.

FIG. 9 illustrates an example architecture of a system 900 for ranking a difficulty of language learning content item 902. While FIG. 8 provides an overall architecture of select components of a foreign language learning system, the example illustrated in FIG. 9 provides a more detailed architecture associated with the content leveling system 904. For instance, in the illustrated example as content items 902 are received from a content item database 906, a content leveling system 904 processes the content item 902 to assign a difficulty level to the content item 902 prior to providing to a catalog of foreign language learning titles available to one or more users.

In some cases, the content leveling system 904 may include a content item processing module 908. The content item processing module 908 may strip punctuation and case from the text of the content item 902 and tokenize whitespace and special characters. The content leveling system 904 may also have a word identification module 910 to identify individual words 914 from the text. The content leveling system 830 may also include a ranking module 912 that compares the identified words with one or more dictionaries 916, such as the NGSL, to identify the number or percentage of the words 914 in the text of the content item 902 or title that are also present in the dictionary database 914. The ranking module 912 may make a determination as to the difficult level 918 of a particular content item 902 based in part on the number of the words 914 appearing in the dictionary database 916 or the percentage of words in the dictionary database 916. The ranking module 912 may also consider the length of the words, the length of the definitions, the number of definitions, the number of syllables, the length of the pronunciation key, etc. when assigning the difficulty level 918 to the content item 902.

In some cases, the word identification module 910 may also be configured to identify parts of speech and/or sentence length associated with a title. For example, if the title includes more than a predetermined number of sentence with more than a predetermined number of words, the ranking module 912 may rank the title as more difficult than the ranking module 912 would using purely a word based analysis.

Once the difficulty level 918 is assigned or associated with the content item 902, the content leveling system 904 may provide the difficulty level 918 to a level database 920 for access by, for example, a foreign language content creation system or a content recommendation system of the system 900.

In the illustrated example, the content leveling system 904 may be in communication with the content item database 906, the dictionary database 916, and level database 920 via one or more networks, generally illustrated by networks 922-926. The networks 922-926 may be representative of wired technologies (e.g., wires, USB, fiber optic cable, etc.), wireless technologies (e.g., RF, cellular, satellite, Bluetooth, etc.), or other connection technologies. The networks 808, 810, and 812 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

FIGS. 10-14 are flow diagrams illustrating example processes associated with the foreign language learning system. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 10:
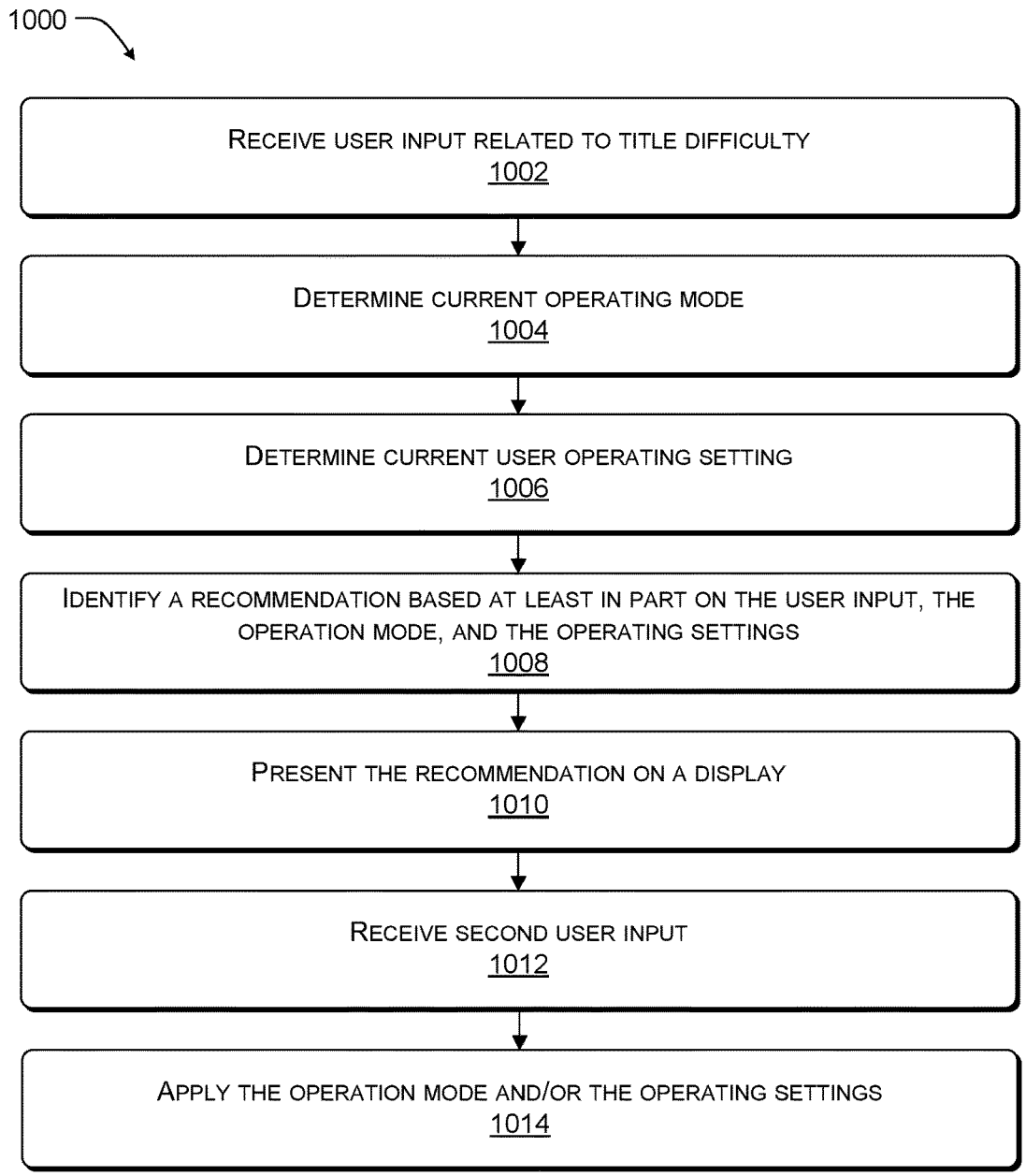
FIG. 10 illustrates an example flow diagram showing an illustrative process for recommending adjustments to improve foreign language absorption by a user.

FIG. 10 illustrates an example flow diagram showing an illustrative process 1000 for recommending adjustments to improve foreign language absorption by a user. For example, the foreign language learning system including a foreign language learning application or reader application operation on a user's device and/or one or more cloud services or cloud based systems operation on one or more servers in communication with the user's device may monitor the user's progress through a foreign language content item to determine if the content item is too difficult or too easy for effective language learning.

At 1002, the system may receive user input related to title difficulty. For example, the system may present to the user one or more selectable options (as described above with respect to FIGS. 1-3, to rate the difficulty of the foreign language learning content item or title. In other cases, the system may monitor the user's progress or interactions with the content item to determine the titles difficulty.

At 1004, the system determines the user device's current operation mode or the current mode of the foreign language learning application. For example, the system may determine if the user is consuming content in a read and listen mode, a read only mode, or a listen only mode.

At 1006, the system determines the user device's settings or the settings associated with the foreign language learning application. For example, the system may determine if the user is consuming content with or without highlighting turned on or a read rate associated with the audio output.

At 1008, the system identifies recommendation based at least in part on the user input, the operation mode, and the operating settings. For example, the system may determine the foreign language learning content item is too difficult for appropriate foreign language absorption and recommend the user switch to listen and read mode, a reduction in read rate, and/or the user turn on highlighting.

At 1010, the system presents the recommendations on a display of the user device. For example, as shown above with respect to FIG. 4, the system may present one or more options to the user including the current settings and new or recommended settings, such that the user is able to determine what the changes are and to select one or more of the recommendations prior to consuming additional portions of the foreign language learning content item.

At 1012, the system receives a second user input. For example, the user may select one or more options presented at 1010 and then apply the settings by clicking or tapping on an accept option as shown above with respect to FIG. 4. At 1014, the system may then apply the operation mode and/or the operating settings accepted by the user and resume the normal operations of the foreign language learning application.

Figure 11:
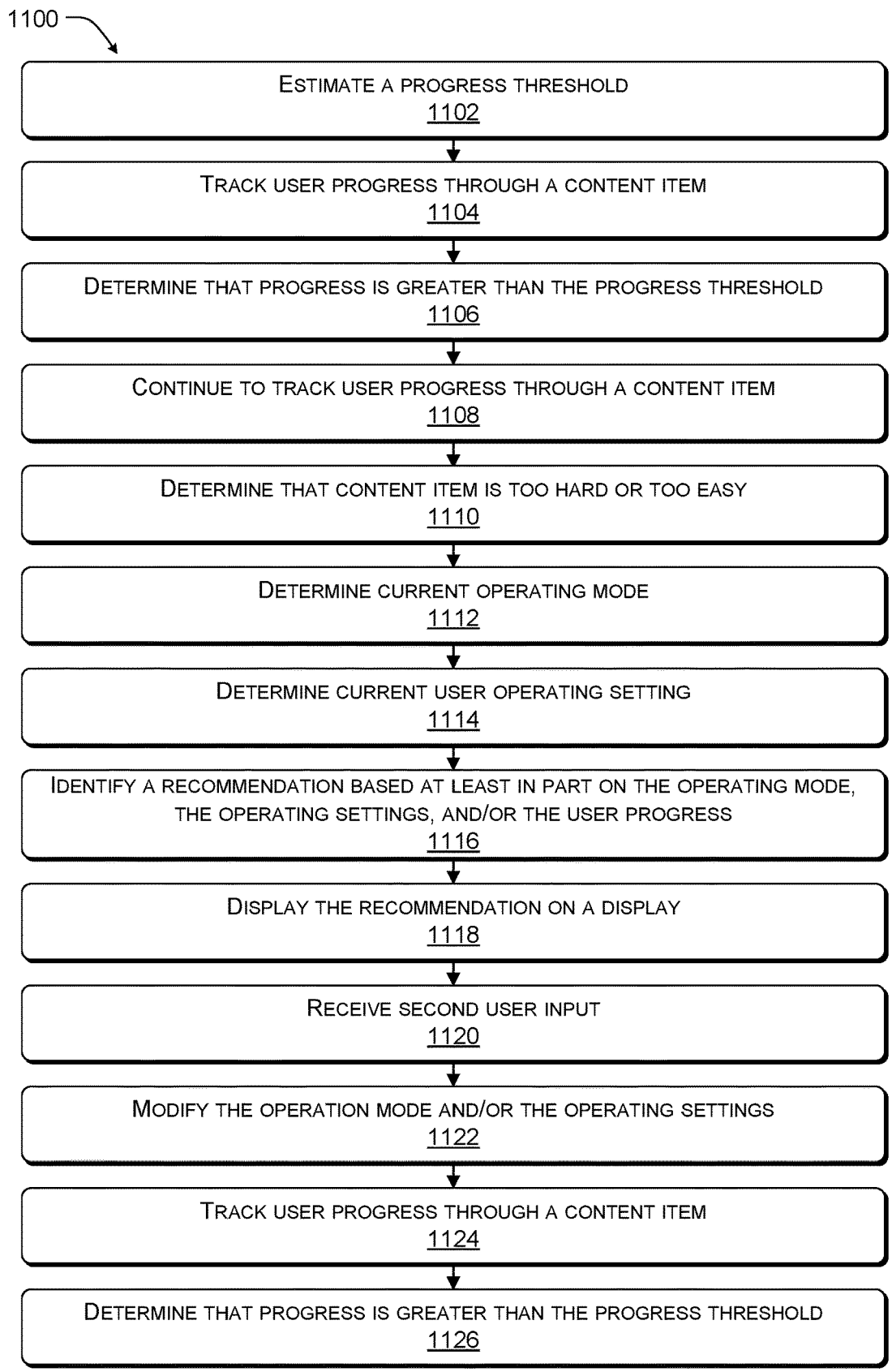
FIG. 11 illustrates an example flow diagram showing an illustrative process for recommending adjustments to improve foreign language absorption by a user.

FIG. 11 illustrates an example flow diagram showing an illustrative process 1100 for recommending adjustments to improve foreign language absorption by a user. For example, the foreign language learning system including a foreign language learning application or reader application operation on a user's device and/or one or more cloud services or cloud based systems operation on one or more servers in communication with the user's device may monitor the user's progress through a foreign language content item to determine if the content item is too difficult or too easy for effective language learning.

At 1102, the system may analyze a content item to estimate a progress threshold. In general, the progress threshold may be an estimate for the expected progress of the user through the content item. For example, the progress threshold may be a number of pages per reading period (e.g., 5 pages every 15 minutes), an amount of time spent consuming the title over a period of time (e.g., 5 hours within 7 days), among others. In some cases, the progress threshold may be determined based at least in part on information known about the user (e.g., reading comprehension level or language accusation level for a particular language, amount of content in the language consumed, number of study words, etc.) as well as information known about the content item (e.g., length of sentences, length of words, use of compound words, subject matter, etc.).

At 1104, the system may track the user's progress through the content item. For example, the system may track the number of times the user's replays or rereads content, pauses the audio output, lookups a definition or pronunciation, the rate at which the user consumes the content, amount of content consumed, number of words listened to and/or read, among others.

At 1106, the system determines that the user progress is greater than the progress threshold or above a margin of error associated with the progress threshold. Thus, the system may determine that the user's progress is adequate and that the content item is at the correctly difficulty level. In some other, the system may determine that the user progress is greater than a threshold. For example, the system may determine the user has consumed a sufficient number of words or a sufficient amount of content that the user is making adequate progress and that the user settings and modes are currently acceptable for learning the foreign language at the user's current skill level. In other cases, the system may determine the user's progress is acceptable if the user progress is below a threshold. For example, if the user has looked up less than a predetermined number of words or paused the audio output fewer than a threshold number of times.

At 1108, the system continues may track the user's progress through the content item. For example, the difficulty or ease of a content item may vary as the user progresses through the content. For instances, some chapters of the foreign language learning content item may be easier to understand than others depending on the length, number of words, length of words, subject matter associated with the words, etc.

At 1110, the system determines that the content item is too hard or too easy and should be change for improved foreign language absorption. In one example, the system may determine that the user progress is less than the progress threshold. For example, the system may determine the user has not consumed a sufficient number of words or a sufficient amount of content and that the content item is too difficult for learning the foreign language at the user's current skill level. In other cases, the system may determine the user's progress is acceptable if the user progress is above a threshold. For example, if the user has looked up more than a predetermined number of words or paused the audio output more than a threshold number of times. Likewise, the system may determine the content item is too easy if the user has consumed a greater than the progress threshold number of words or amount of content. In other cases, the system may determine the content item is too easy if the user progress is below a margin of error associated with the progress threshold. For example, if the user has looked up less than a predetermined number of words or paused the audio output fewer than a threshold number of times.

At 1112, the system determines the user device's current operation mode or the current mode of the foreign language learning application. For example, the system may determine if the user is consuming content in a read and listen mode, a read only mode, or a listen only mode.

At 1114, the system determines the user device's settings or the settings associated with the foreign language learning application. For example, the system may determine if the user is consuming content with or without highlighting turned on or a read rate associated with the audio output.

At 1116, the system may identify a recommendation based at least in part on the operating mode, the operating settings, and/or the user progress. For example, the system may determine the foreign language learning content item is too difficult for appropriate foreign language absorption and recommend the user switch to listen and read mode, a reduction in read rate, and/or the user turn on highlighting.

At 1118, the system presents the recommendations on a display of the user device. For example, as shown above with respect to FIG. 4, the system may present one or more options to the user including the current settings and new or recommended settings, such that the user is able to determine what the changes are and to select one or more of the recommendations prior to consuming additional portions of the foreign language learning content item. In other cases, the system may recommend a quiz or test to the user.

At 1120, the system receives a second user input. For example, the user may select one or more options presented at 1118 and then apply the settings by clicking or tapping on an accept option as shown above with respect to FIG. 4. At 1122, the system may then apply the operation mode and/or the operating settings accepted by the user and resume the normal operations of the foreign language learning application.

At 1124, the system may again track the user's progress through the content item. For example, the system may track the number of times the user's replays or rereads content, pauses the audio output, lookups a definition or pronunciation, the rate at which the user consumes the content, amount of content consumed, number of words listened to and/or read, among others.

At 1124, the system again determines that the user progress is greater than the progress threshold or that the content item is at the correctly difficulty level. In some cases, the system may determine that the user progress is greater than a threshold. For example, the system may determine the user has consumed a sufficient number of words or a sufficient amount of content that the user is making adequate progress and that the user settings and modes are currently acceptable for learning the foreign language at the user's current skill level. In other cases, the system may determine the user's progress is acceptable if the user progress is below a threshold. For example, if the user has looked up less than a predetermined number of words or paused the audio output fewer than a threshold number of times.

Figure 12:
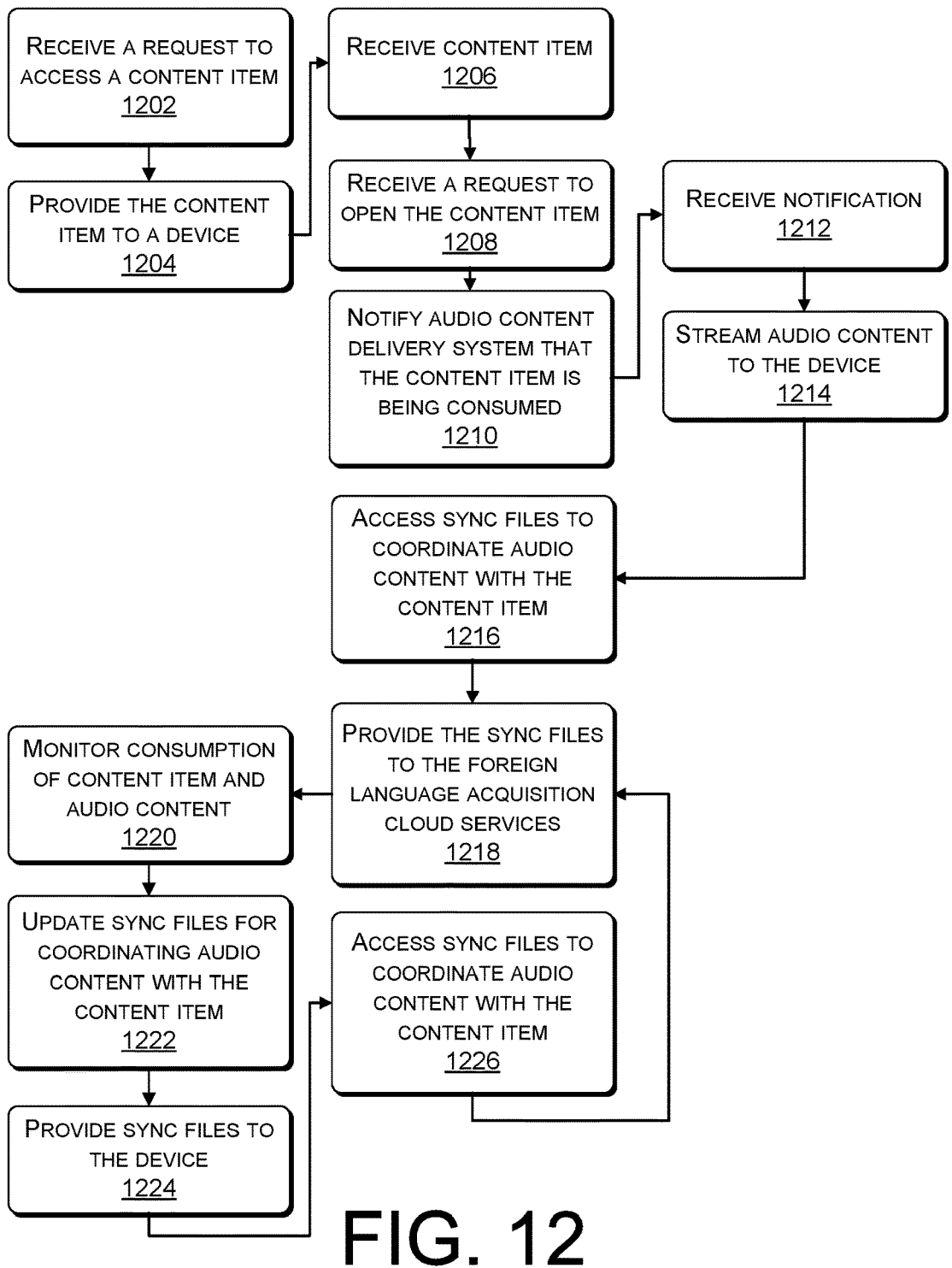
FIG. 12 illustrates an example flow diagram showing an illustrative process for providing language learning content to a user device.

FIG. 12 illustrates an example flow diagram showing an illustrative process 1200 for providing language learning content to a user device. For example, the foreign language learning system may receive content items from a third party provider (e.g., a publisher), obtain the rights to the audio version of the content item, and/or foreign language versions of the content item. The system may also rank the difficulty level of the content item, add foreign language metadata tags, and/or additional supplemental content (such as definitions) to the foreign language learning content item prior to making the content items available for download or streaming via one or more content provider systems or catalogs.

At 1202, the foreign language learning cloud services may receive a request to access (e.g., download or stream) a foreign language learning content item from a user device. For example, a user may purchase the rights to a particular content item from one or more marketplaces or digital libraries associated with the foreign language learning system.

At 1204, the foreign language learning cloud services provides the foreign language learning content item to the requesting device. For example, the foreign language learning cloud services may provide the native language content text and the foreign language content text to the user device via either a download or via a streaming service. At 1206, the user device receives the foreign language learning content item from the cloud services or server system.

At 1208, the device or the foreign language learning application operating on the device receives a request to open the foreign language content item. For example, the user may open the foreign language learning application and the application may open back to the page or portion of the content item the user was previously consuming.

At 1210, the foreign language learning application causes the device to notify an audio content delivery system that the foreign language learning content item is being consumed by the user. For example, the foreign language learning application may request that the audio provider stream audio content corresponding to the foreign language content item to the device.

At 1212, the audio content delivery system receives the notification from the device and, at 1214, the audio content delivery system streams the audio content to the device.

At 1216, the foreign language learning application access synchronization files to coordinate an output of the audio content as sound with the foreign language learning content item. For example, the foreign language learning application may include one or more modules or files that are configured to coordinate highlighting of the text in conjunction with the output of the audio content at the read rate selected by the user.

At 1218, the foreign language learning application provides the synchronization files to the foreign language learning cloud services. For example, the device may send a notification to the cloud services after a predetermined period of time has elapsed following initiation of output of the audio content or may send a notification at parodic intervals.

At 1220, the foreign language learning cloud services monitors consumption of the content item and the audio content. For example, the foreign language learning cloud services may analyze the synchronization file to determine if the output of the audio content is coordinated with the highlighting of the text of the foreign language learning content item to ensure the user is hearing the word that the user is reading.

At 1222, the foreign language learning cloud services may update the synchronization files for coordinating the output of the audio content with the content item. For example, if the foreign language learning cloud services identifies a time gap or delay between the output of the audio content and the highlighting of the text of the foreign language learning content item, the cloud services may modify one or more parameters associated with the synchronization file to cause the device to alter the output of the audio content to improve the coordination between the audio and the text highlighting.

At 1224, the foreign language learning cloud services provides the synchronization file back to the device. At 1226, the foreign language learning access the synchronization files to coordinate the output of the audio content with the content item. For exam foreign language learning application may alter one or more settings based at least in part on the one or more parameters modified by the cloud services and the process 1200 returns to 1218.

Figure 13:
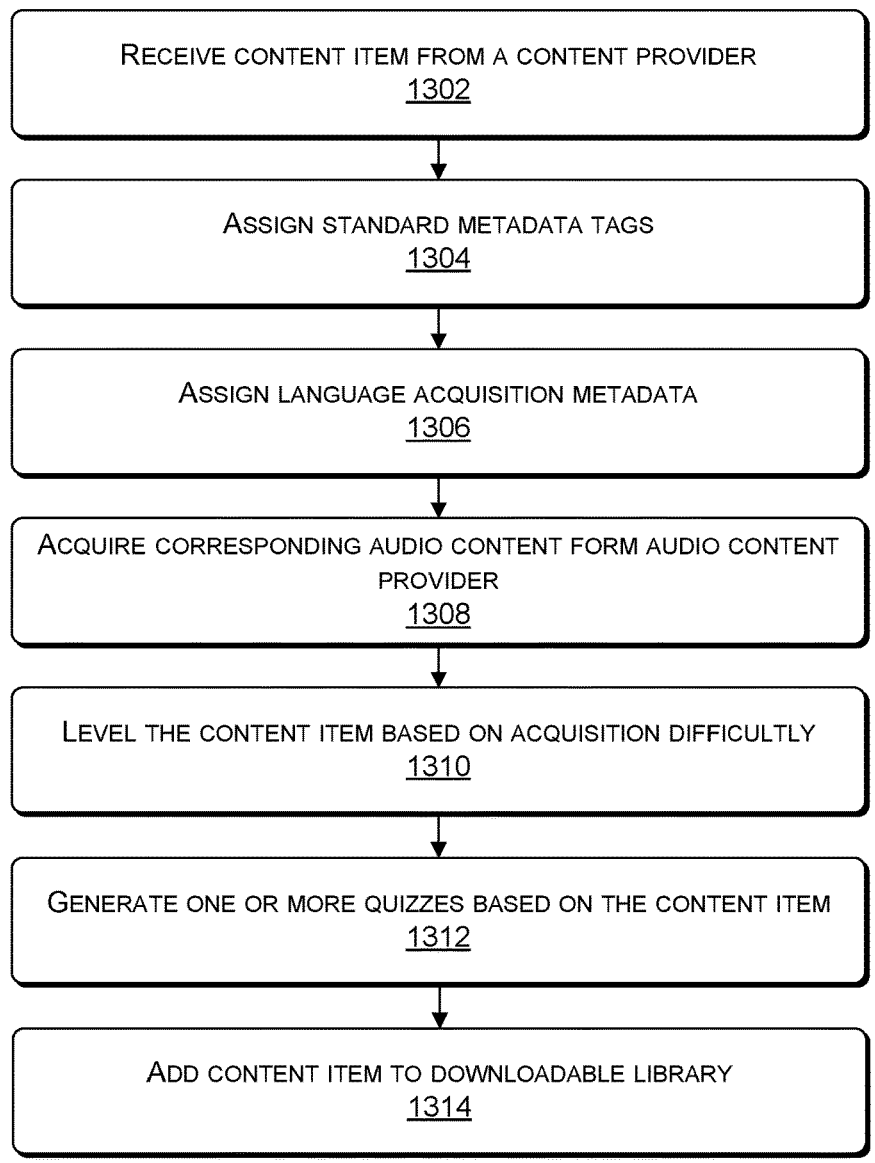
FIG. 13 illustrates an example flow diagram showing an illustrative process for ranking a difficulty of language learning content.

FIG. 13 illustrates an example flow diagram showing an illustrative process 1300 for ranking a difficulty of language learning content. For example, different content items may be of varying difficulty for a foreign language speak to consume (e.g., reading the United States Constitution may be harder for a non-English native speaker than reading a children's book). Therefore, the foreign language learning system described herein ranks the difficulty of each content item as the content item is received from a third party content provider to assist the foreign language learning user in selecting a title appropriate for the user's skill level.

At 1302, the foreign language learning system receives a content item from a third party content provider. For example, a publisher or author may upload a content item, such as a book, to the system for distribution to end consumer to assist with sales of the content item.

At 1304, the foreign language learning system assigns standard metadata tags to the content item. For example, the foreign language learning system may assign metadata tags in the language of the content item (e.g., English metadata tags for an English content item). In some cases, the standard metadata tags are similar to the metadata tags that would be assigned for a content item available via typical distribution methods.

At 1306, the foreign language learning system assigns foreign language metadata tags to the content item. For example, the foreign language learning system may assign metadata tags in the language of the content item targeted reader (e.g., Japanese metadata tags for an English content item). In some cases, the foreign language metadata tags may be utilized by the foreign language learning system in recommending title to the user as well as for the user to select foreign language learning content items that may be of interest to the user.

At 1308, the foreign language learning system acquires the audio content corresponding to the content item from the audio content provider. For example, the foreign language learning system may access an audio book provider to obtain rights to distribute the audio book with the text content. Additionally, in some cases, if the audio content for a particular content item is unavailable the system may reject the submission, as the content item may not be conductive for foreign language learning.

At 1310, the foreign language learning system levels the content item based on the learning difficulty for a native foreign speaker. For example, the system may determine the difficulty by stripping punctuation and case from the text of the content item, tokenizing whitespace and special characters, and identifying individual words of the text. The words may then be compared with one or more dictionaries, such as the NGSL, to identify the number or percentage of words in the text of the content item that are also present in the dictionary. The difficulty level may then be assigned based at least in part on the number of words appearing in the dictionary or the percentage of words in the dictionary.

At 1312, the foreign language learning system may generate one or more quizzes to associate with the content item. In some cases, the quizzes may be used to determine if the reader is ready or at a sufficient level to consume the content item or to test the reader in order to gage if the content item is too difficult or too easy.

At 1314, the foreign language learning system may add the content item to a downloadable library or marketplace accessible by the end consumers. For example, the library may be searchable by title, difficulty level, language, metadata tags, price, etc.

Figure 14:
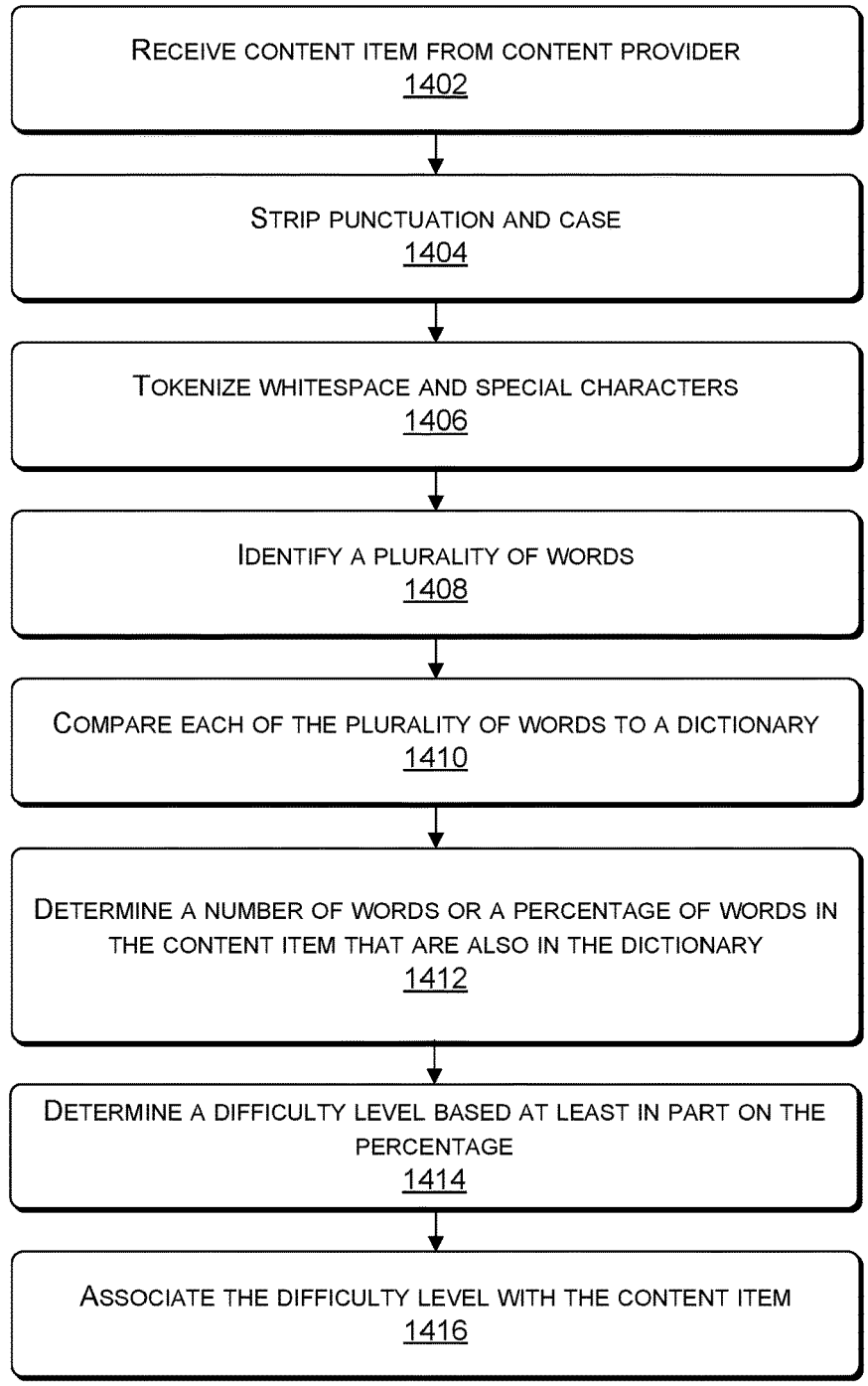
FIG. 14 illustrates another example flow diagram showing an illustrative process for ranking a difficulty of language learning content.

FIG. 14 illustrates another example flow diagram showing an illustrative process 1400 for ranking a difficulty of language learning content. For example, different content items may be of varying difficulty for a foreign language speak to consume (e.g., reading the United States Constitution may be harder for a non-English native speaker than reading a children's book). Therefore, the foreign language learning system described herein ranks the difficulty of each content item as the content item is received from a third party content provider to assist the foreign language learning user in selecting a title appropriate for the user's skill level.

At 1402, the foreign language learning system receives a content item from a third party content provider. For example, a publisher or author may upload a content item, such as a book, to the system for distribution to end consumer to assist with sales of the content item.

At 1404, the foreign language learning system or the content leveling system associated with the foreign language learning system may strip punctuation and case from the content item. For example, the system may parse the text character by character to identify the punctuation marks to remove them from the content item and the capitalized letters to replace them with lower case letters.

At 1406, the foreign language learning system or the content leveling system associated with the foreign language learning system may tokenize the whitespace of the content item. For example, as the system parses the text character by character, the system may identify the spaces, tabs, returns, etc. and to replace them by an identifiable token character.

At 1408, the foreign language learning system or the content leveling system associated with the foreign language learning system identifies a plurality of words from the tokenized text. For instance, the system may parse the text of the content item again to identify words using the tokens.

At 1410, the foreign language learning system or the content leveling system associated with the foreign language learning system compares each of identified words with a dictionary. For example, the system may compare the words to the NGSL to identify if the word is present or not.

At 1412, the foreign language learning system or the content leveling system associated with the foreign language learning system determines a number of words or a percentage of words in the content item that are also in the dictionary. For instance, the system may determine a percentage by taking the number of words matching a word in the NGSL over the number of words identified at 1408.

At 1414, the foreign language learning system or the content leveling system associated with the foreign language learning system determines a difficulty level based at least in part on the percentage or number of words. For instance, the content item may be assigned a higher difficulty the lower the percentage of words in the NGSL.

At 1416, the foreign language learning system or the content leveling system associated with the foreign language learning system may associate the difficulty level with the content item. In this manner, the system and/or the user may select titles that are more appropriate for the user's current foreign language skill.

Figure 15:
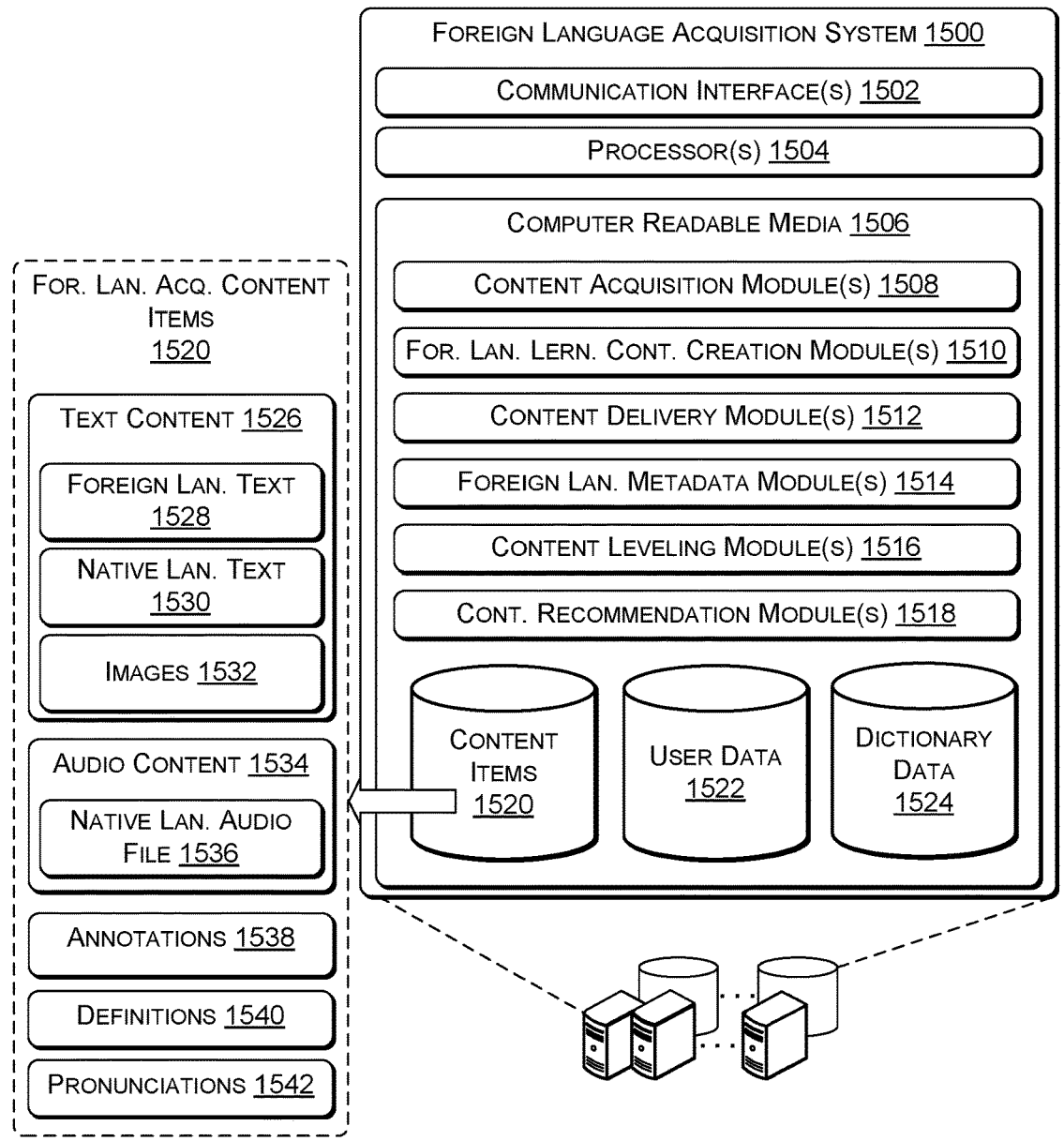
FIG. 15 illustrates an example architecture of a system configured to provide guided foreign language learning.

FIG. 15 illustrates an example architecture of a system 1500 configured to provide guided foreign language learning. In some implementations, the foreign language learning system described herein may include applications hosted by one or more user devices as well as various cloud based services hosted on one or more servers and/or database remote from the end users. For example, the cloud services may include any number of network accessible platforms implemented as a computing infrastructure of processors, storage, software, data access, and so forth that is maintained and accessible via a network such as the Internet. The cloud services 806 do not require end-user knowledge of the physical location and configuration of the system that delivers the services. Common expressions associated with cloud services 806 include "on-demand computing," "software as a service (SaaS)," "platform computing," "network accessible platform" and so forth.

In the illustrated example, the system 1500 includes one or more communication interfaces 1502, one or more processors 1504, and computer computer-readable media 1506. The communication interfaces 1502 may facilitate communication between one or more wireless access points, a master device and/or one or more other computing devices as part of an ad-hoc or home network system. The communication interfaces 1502 may be used to communicate with other local devices and may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interfaces 1502 may facilitate streaming or audio and/or text content to one or more user devices to provide foreign language learning content to an end user.

The processors 1504 may be one or more accesses components such as at least one or more control logic circuits, central processing units, or processors, and one or more computer-readable media 1506 to perform the function of the system 1500. Additionally, each of the processors 1504 may itself comprise one or more processors or processing cores.

Depending on the configuration of the system 1500, the computer-readable media 1506 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 1504.

Various instruction, information, data stores, and so forth may be stored within the computer-readable media 1506 and configured to execute on the processors 1504. For instance, the computer-readable media 1506 may store one or more modules or applications, such as a content acquisition module 1508, a foreign language learning content creation module 1510, a content delivery module 1512, a foreign language metadata module 1514, a content leveling module 1516, and/or a content recommendation module 1516. The computer-readable media 1506 may also store various data, such as electronic content items 1520, user data 1522, and/or dictionary data 1524. In some examples, the applications or modules may include instructions which when executed by the processors 1504 to cause the foreign language learning applications operation on user devices to perform various functions. For example, the applications may include an application to allow a user to consume foreign language content items via an application operating on the user device.

The content acquisition module 1508 may be configured to identify or receive content items from the third party content provides (such as publishers, writers, authors, distributors, etc.). The content acquisition module 1508 upon receipt of a particular content item 1520 or title, contact one or more third party content providers in order to acquire the rights to distribute a foreign language content item (e.g., the foreign version of the same content item, such as the Japanese language equivalent of an the English language content item). The content acquisition module 1508 may also contact one or more third party audio content providers 820 to acquire the rights to the audio version for the for the desired foreign language.

The foreign language learning content creation module 1510 generate or curate additional content that may be useful in learning the foreign language while the content items consumed. For example, the foreign language learning content creation module 1510 may include a dictionary module or system that may obtain dictionary definitions and pronunciations for words associated with the content items in the language being acquired. The foreign language learning content creation module 1510 may also be configured to combine the content item and the foreign language content item together with the curated content as the foreign language learning content 1520, such that the dictionary definitions and pronunciations may be provided to the reader with the native language text and the foreign language text of the content item 1520 to assist with reading comprehension. In other cases, the dictionary definitions and/or pronunciations may be delivered ad hoc at the time the user looks up the word via another system, such as a dictionary system and/or additional third party dictionary providers.

The content delivery module 1512 may assist with delivering the language learning content items 1520 and synchronizing the audio output provided by the third party audio content delivery system at the user device. For example, the content delivery module 1512 may facility downloading or streaming of the language learning content items 1520 to the user device. The content delivery module 1512 may also receive notifications from the user device when the user is consuming the language learning content items and, for instance, via the notification the content delivery module 1512 may monitor the output of the audio content with the text of the language learning content items 1520 to ensure the output is synchronized.

The foreign language metadata module 1514 may be configured to, for example, associated foreign language metadata to the content item 1520 in order to assist the foreign language reader with selecting a title of interest. For example, the foreign language metadata module 1514 may assign language identifies associated with genre, characters, plot, subject matter, title, etc. In the foreign language to assist with title selection. In this manner, the foreign language reader may select titles of interest by previewing the foreign language tags rather than merely selecting a title with no concept of the subject matter or based on the foreign reader's current limited understanding of language being acquired.

The content leveling module 1514 may be configured to rank a difficulty associated with reading a particular content item. For example, the content leveling module 1514 may upon receipt of a native language content item 1530, strip punctuation and case from the text of the content item, tokenize whitespace and special characters, and identify individual words of the text. The content leveling module 1514 may then compare the identified words with one or more dictionaries, such as the NGSL, to identify the number or percentage of words in the text of the content item or title that are also present in the dictionary. The content leveling module 1514 may make a determination as to the difficult of a particular foreign language learning content item 1520 based in part on the number of words appearing in the dictionary or the percentage of words in the dictionary. The content leveling module 1514 may also consider the length of the words, the length of the definitions, the number of definitions, the number of syllables, the length of the pronunciation key, etc.

The content recommendation module 1516 may be configured to recommend language learning content items 1520 that may be of interest to particular readers acquiring the foreign language. In some cases, the content recommendation module 1516 may select the recommended titles based at least in part on information known about the reader (e.g., previously consumed titles in the foreign language and/or in the readers native language, titles abandoned by the user, user survey data, user settings, user browsing history, search history, time spent on similar titles etc.), information known about the language learning content, items (e.g., chapter titles, native language metadata tags, foreign language metadata tags, publisher information, subject matter, content difficulty level, etc.), as well as information aggregated across users (e.g., user comments, what other content items or titles were consumed by readers that completed the recommend language learning content items 1520, etc.) current on selected titles, completed titles, abandoned titles (e.g., titles that the reader failed to finish).

In some implementations, one or more of the foreign language learning content items 1520 may be stored on the system 1500 or in a database associated with the system 1500. Each content item 1520 may include text content 1526, such as foreign language text 1528, native language text 1530, and/or images 1532 or graphics. The content items 1520 may also include audio content 1534, such as the audio file 1536 in the native language of the content item 1520. In some particular implementations, the content item 1520 may also include annotations 1538, dictionary definitions 1540, and/or audio and/or text pronunciations 1542. In some specific implementations, the content items 1520 may include electronic books or "eBooks" as well as audio books. For example, eBooks may include text and any illustrations, tables, or graphic elements that might be contained in a print version of the eBook and the audio books may include recordings of one or more individuals reading the book. In some cases, the content items 1520 may include electronic or digital representations of printed works, as well as multimedia objects, hypertext, and/or hypermedia. In other implementations, the content items 1520 may include digital copies of magazines, newspapers, periodicals, journals, reference materials, telephone books, textbooks, anthologies, instruction manuals, proceedings of meetings, forms, directories, maps, web pages, and so forth.

The computer-readable media 1506 may also store the user data 1522 and the dictionary data 1524 that may be accessible to one or more of the systems 1508-1516 for assistance in providing the foreign language learning. For example, the user data 1522 may be utilized the by the content recommendation system 1518 to select one or more content items 1520 to recommend to the user for consumption.

Figure 16:
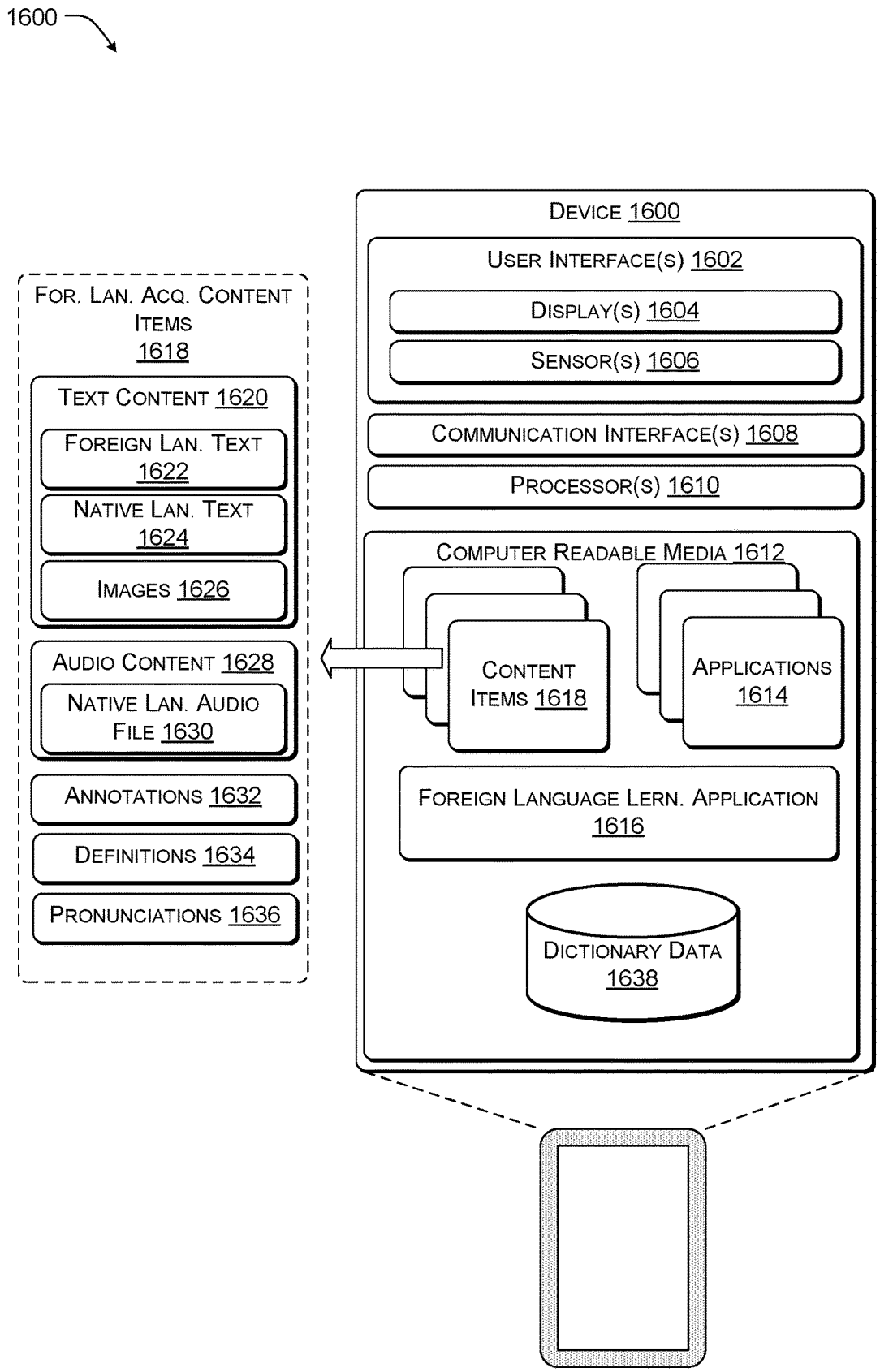
FIG. 16 illustrates an example architecture of a device configured to provide guided foreign language learning.

FIG. 16 illustrates an example architecture of a device 1600 configured to provide guided foreign language learning. In some implementations, the user may access the foreign language learning system via a user device, such as electronic book readers, cellular telephones, smart phones, portable media players, tablet computers, wearable computers, laptop computers, netbooks, desktop computers, televisions, appliances, home electronics, automotive electronics, augmented reality devices, and so forth to view and/or listen to digital content.

The device 1600, generally, includes one or more user interfaces 1602 for presenting information or data and for receiving user inputs. The user interfaces 1602 may include one or more output components, such as a display or touch screen, and one or more input components, such as keyboards, keypads, joysticks, a mouse, a touch screen, touch pad, drawing pad, or control buttons. In some implementations, the output components and input components are combined in a single user interface 1602 to provide a touch-sensitive display, or touch screen display. For instance, in the illustrated example, the user interface 1602 includes one or more displays 1604 for presenting information, such as electronic content items, to a user, one or more sensors 1606 for accepting input resulting from contact and/or application of incident force, such as a user finger or stylus pressing upon one of the sensor 1606. In some specific implementations, the device 1600 may be configured to receive user inputs by communicating with an active stylus. For example, the active stylus and the device 1600 may actively exchange data related to the user inputs.

In some cases, the sensors 1606 may be a touch sensor couple to a touch layer (not shown), such as an indium tin oxide (ITO) layer arranged in a grid pattern below the top surface of the display 1604. In this case, the touch sensor is configured to determine characteristics of user interaction with the display 1604 detected by the ITO layer. These characteristics may include the location of the touch on the display 1604, magnitude of the force, shape of the touch, and so forth.

In some implementations, the display 1604 may present content in a human-readable format to a user. The display 1604 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays (LCDs), time multiplexed optical shutter displays, light emitting diode (LED) displays, and so forth. When multiple displays are present, these displays may be of the same or different types. For example, one display may be an electrophoretic display while another may be a liquid crystal display. In some implementations, multiple displays 1604 may be present and/or coupled to the device 1600. These multiple displays 1604 may be located in the same or different enclosures or panels.

For convenience, the display 1604 is shown in FIGS. 1-7 in a generally rectangular configuration. However, it should be understood that the display 1604 may be implemented in any shape, and may have any ratio of height to width. Also, for stylistic or design purposes, the display 1604 may be curved or otherwise non-linearly shaped. Furthermore, the display 1604 may be flexible and configured to fold or roll.

The device 1600 also includes one or more communication interfaces 1608 to facilitate communication between one or more networks (such as the Internet® or one or more local area networks), directly with one or more devices, and/or with one or more cloud services (such as the foreign language learning system). The communication interfaces 1608 may also facilitate communication between one or more wireless access points, a master device, and/or one or more other computing devices as part of an ad-hoc or home network system. The communication interfaces 1608 may support both wired and wireless connection to various networks, such as cellular networks, radio, WiFi networks, short-range or near-field networks (e.g., Bluetooth®), infrared signals, local area networks, wide area networks, the Internet, and so forth.

The device 1600 includes or accesses components such as at least one or more control logic circuits, central processing units, or processors 1610, and one or more computer-readable media 1612 to perform the function of the device 1600. Additionally, each of the processors 1610 may itself comprise one or more processors or processing cores.

Depending on the configuration of the device 1600, the computer-readable media 1612 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 1610.

Various instruction, information, data stores, and so forth may be stored within the computer-readable media 1612 and configured to execute on the processors 1610. For instance, the computer-readable media 1612 may store one or more applications 1614, such as a foreign language learning application 1616) and/or one or more foreign language learning content items 1618. In some examples, the foreign language learning application 1616 may include instructions which when executed by the processors 1610 cause the device 1600 to guide the user through consuming a foreign language learning content item 1618.

In some implementations, one or more of the foreign language learning content items 1618 may be stored on the device 1600, while other foreign language learning content items may be store in a remote database associated with the foreign language learning system available to stream or download to the device 1600. Each content item 1618 may include text content 1620, such as foreign language text 1622, native language text 1624, and/or images 1626 or graphics. The content items 1618 may also include audio content 1628, such as the audio file 1630 in the native language of the content item 1618. In some particular implementations, the content item 1618 may also include annotations 1632, dictionary definitions 1634, and/or audio and/or text pronunciations 1636.

In addition to the foreign language learning content items 1618, in some implementations, the computer readable media 1612 may also store dictionary data 1638. In these cases, the foreign language learning application may access the dictionary data 1638 stored on the device 1600 in lieu accessing cloud service to obtain the definitions on a case by case basis.

In some specific implementations, the content items 1618 may include electronic books or "eBooks" as well as audio books. For example, eBooks may include text and any illustrations, tables, or graphic elements that might be contained in a print version of the eBook and the audio books may include recordings of one or more individuals reading the book. In some cases, the content items 1618 may include electronic or digital representations of printed works, as well as multimedia objects, hypertext, and/or hypermedia. In other implementations, the content items 1618 may include digital copies of magazines, newspapers, periodicals, journals, reference materials, telephone books, textbooks, anthologies, instruction manuals, proceedings of meetings, forms, directories, maps, web pages, and so forth.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
under control of one or more computer systems configured with executable instructions,
sending first text associated with a content item to a display, the first text in a first language and including a word;
sending an audio signal to an output component, the audio signal corresponding to the word in the first language;
sending an indication to the display to present at least one selectable option, the at least one selectable option including second text in a second language, the second language different than the first language;
sending an indication to the display to cause the word to be differentiated on the display from other words of the first text of the content item, the other words different than the word;
receiving an indication of a selection of the at least one selectable option, the selection representative of a perceived difficulty of the content item and an interest level of the content item;
determining at least one recommended setting to improve learning based at least in part on the perceived difficulty;
identifying at least one recommended alternative content item based at least in part on the interest level and user data associated with a user, wherein text of the alternative content item is in the first language;
sending a portion of the text associated with the alternative content item to the display; and
sending a request to a component to apply the at least one recommended setting to the alternative content item.

2. The method of claim 1, further comprising:
sending a setting to the display; and
receiving an indication of a second selection associated with setting.

3. The method of claim 2, wherein third text of the setting is in the second language.

4. The method of claim 1, wherein the at least one recommended setting is associated with distinguishing the word from the text.

5. The method of claim 1, further comprising:
determining a criteria has exceed or meet a threshold; and
sending the selectable option associated with the perceived difficulty and the interest level of the content item to the display based at least in part on the criteria exceeding or meeting the threshold.

6. The method of claim 5, wherein the criteria includes at least one of the following:
a period of time;
a number of pause requests;
a number of replays requests;
a number of definitions access requests; or
a number of pronunciations access requests.

7. The method of claim 1, further comprising:
sending at least one definition associated with a particular word of the first text to the display based at least in part on receiving a second user input associated with the particular word, the definition in the second language; and
sending at least one pronunciation key associated with the particular word of the first text to the display based at least in part on receiving the second user input associated with the particular word, the at least one pronunciation key in the first language.

8. The method of claim 1, wherein the setting is a read rate associated with an output of the audio signal corresponding to the first text by the output component.

9. The method of claim 1, further comprising:
sending a second selectable option to the display, the second selectable option including third text in the second language and associated with a perceived interest of the content item.

10. The method of claim 1, further comprising:
sending a second selectable option to the display based at least in part in the user re-reading a particular portion of the first text more than a threshold number of times, the second selectable option including third text in the second language and associated with a perceived difficulty of the content item.

11. The method of claim 1, further comprising:
sending a second selectable option to the display based at least in part in the user accessing definitions associated with the words of the first text than a threshold number of times, the second selectable option including third text in the second language and associated with a perceived difficulty of the content item.

12. The method of claim 1, further comprising:
sending a second selectable option to the display based at least in part in the user pausing an output of the audio signal by the audio component more than a threshold number of times, the second selectable option including third text in the second language and associated with a perceived difficulty of the content item.

13. The method of claim 1, further comprising:
sending at least one current setting and at least one recommended setting to the display, third text associated with the at least one current setting in both the first language and the second language and fourth text associated with the at least one recommended setting in both the first language and the second language prior to sending the request to the component to apply the at least one recommended setting to the content item.

14. A device comprising:
one or more processors;
a display;
a speaker;
a computer-readable medium having computer-executable instructions that, when executed by the one or more processors, cause the one or more processors to perform operations comprising:
presenting first text of a content item on the display, the first text displayed in a first language;
causing the speaker, to output an audio signal representative of the first text, the output of the audio signal in the first language;
presenting, concurrently with the first text, at least one selectable option including second text and associated with a difficultly level of a foreign language learning content item to a user, the second text in a second language and the at least one selectable option configured to allow the user to rate a difficultly of the first text of the content item and to rate a difficult of grammar of the content item;

receiving a first indication of a selection of one of the least one selectable option; and based at least in part on receiving the first indication, reducing a rate by which the speaker outputs the audio signal.

15. The device of claim 14, computer-readable medium stores computer-executable instructions that, when executed by one or more processors, cause the one or more processors to perform operations comprising based at least in part on receiving the first indication, sending data to update a user interface, the updated user interface distinguishing a word from a remainder of the first text.

16. The device of claim 14, wherein the computer-readable medium stores computer-executable instructions that, when executed by one or more processors, cause the one or more processors to send at least one current setting and at least one recommended setting to the display, third text associated with the at least one current setting in both the first language and the second language and fourth text associated with the at least one recommended setting in both the first language and the second language prior to sending he request to the display to apply the at least one recommended setting to the content item.

17. The device of claim 14, wherein the at least one selectable option includes:
 a first selectable option representative of a first perceived difficultly of the content item, the second text being in the second language different from the first language;
 a second selectable option including third text and associated with a second perceived difficultly of the foreign language learning content item, the third text being in the second language; and
 a third selectable option including fourth text and associated with a user interest level associated with the foreign language learning content item, the fourth text being in the second language.

18. A device comprising:
 one or more processors;
 a display;
 a speaker for generating and outputting sound into an environment;
 a computer-readable media having computer-executable instructions that, when executed by one or more processors, cause the one or more processors to perform operations comprising:
  sending text associated with a content item to the display, the text including a word and in a first language;
  sending to the speaker an audio signal representative of the word, the audio signal in the first language;
  sending instructions to cause a display to present at least one first selectable option, the at least one selectable option in a second language, the second language different than the first language;
  sending instructions to cause a display to present a second selectable option, the at least one selectable option in a second language;
  receiving an indication of a first selection of one of the at least one first selectable option, the first selection indicating a perceived difficulty of the text;
  receiving an indication of a second selection of the second selectable option, the second selection indicating that the content item is uninteresting;
  identifying at least one recommended alternative content item based at least in part on an interest level and user data associated with a user, wherein text of the alternative content item is in the first language;
  sending a portion of the text associated with the alternative content item to the display; and
  sending a request to a component to apply the at least one recommended setting to the alternative content item.

19. The device of claim 18, wherein the computer-readable media stores computer-executable instructions that, when executed by one or more processors, cause the one or more processors to perform operations comprising:
 sending instructions to cause the display to present at least one definition associated with the word to the display, the definition in the second language.

20. The device of claim 18, wherein the computer-readable media stores computer-executable instructions that, when executed by one or more processors, cause the one or more processors to perform operations comprising:
 determining a predetermined period of time has elapsed; and
 sending instructions to cause the display to present a prompt including the at least one first selectable option and the second selectable option.

* * * * *